United States Patent

Bair et al.

[15] 3,673,143
[45] June 27, 1972

[54] OPTICALLY ANISOTROPIC SPINNING DOPES OF POLYCARBONAMIDES

[72] Inventors: Thomas I. Bair; Paul W. Morgan, both of West Chester, Pa.

[73] Assignee: E. I. du Pont de Nemours and Company, Wilmington, Del.

[22] Filed: June 24, 1970

[21] Appl. No.: 49,539

Related U.S. Application Data

[63] Continuation-in-part of Ser. No. 39,566, May 21, 1970, abandoned, which is a continuation-in-part of Ser. No. 693,739, Dec. 27, 1967, abandoned.

[52] U.S. Cl. .......................... 260/30.2, 260/30.6, 260/32.6 N
[51] Int. Cl. .................................... C08g 51/50, C08g 51/44
[58] Field of Search .................................................... 260/78 R

[56] References Cited

UNITED STATES PATENTS

| | | | |
|---|---|---|---|
| 3,063,966 | 11/1962 | Kwolek et al. | 260/78 R UX |
| 3,287,324 | 11/1966 | Sweeny | 260/78 R |
| 3,300,450 | 1/1967 | Clay | 260/78 S |
| 3,349,062 | 10/1967 | Hill et al. | 260/78 R X |

FOREIGN PATENTS OR APPLICATIONS 917,889   2/1963   Great Britain .......................... 270/78

*Primary Examiner*—Lewis T. Jacobs
*Attorney*—Eugene Berman

[57] ABSTRACT

Fibers of high molecular weight p-oriented polycarbonamides of recurring units of the formula:

(I)

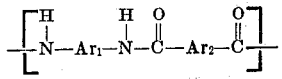

wherein $Ar_1$ is p-phenylene and/or chloro-substituted p-phenylene, and $Ar_2$ is p-phenylene. These fibers have an initial modulus in excess of 170 gpd. and an orientation angle of up to 40° and/or a sonic velocity of at least about 4 km./sec. either as-extruded or after maintaining the fibers at 0.99 to 1.50 times their as-spun lengths and heating in a zone maintained between 200° and 1,000° C.

Optically anisotropic spinning dopes of these polycarbonamides of Formula I units, lithium or calcium chloride and certain amide or urea solvents, are also disclosed.

5 Claims, 1 Drawing Figure

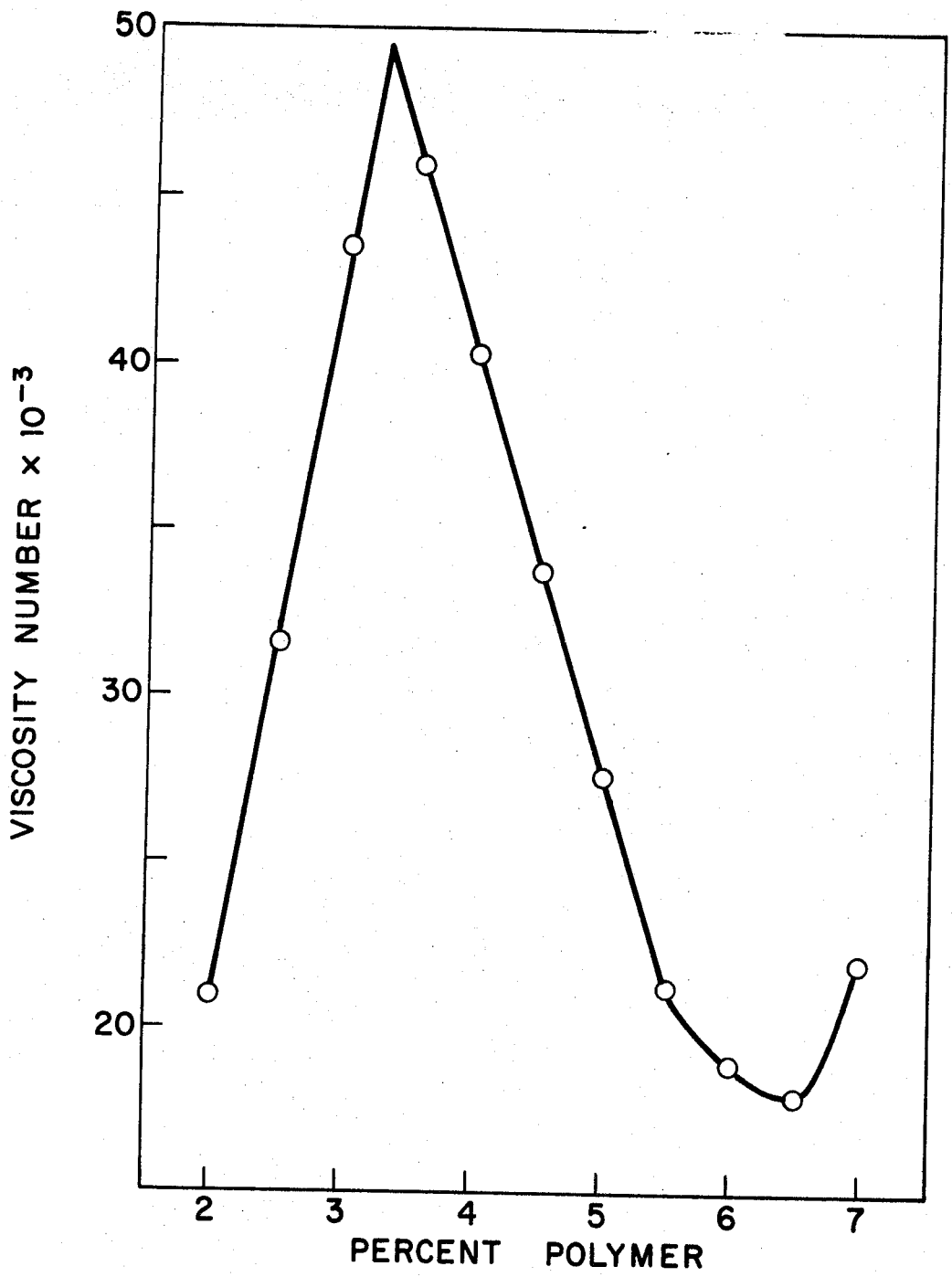

OPTICALLY ANISOTROPIC SPINNING DOPES OF POLYCARBONAMIDES

CROSS-REFERENCE TO RELATED APPLICATIONS

This application is a continuation-in-part of our copending application Ser. No. 39,566, filed May 21, 1970, now abandoned which in turn is a continuation-in-part of our application Ser. No. 693,739, filed Dec. 27, 1967, now abandoned.

This invention relates to novel high strength fibers comprised of poly(p-phenylene terephthalamide), chloro-substituted poly(p-phenylene terephthalamide) and copolymers thereof. Spin dopes of these polymers which exhibit optical anisotropy are also included in this invention.

SUMMARY OF THE INVENTION

This invention provides novel fiber prepared from high molecular weight, synthetic p-oriented polycarbonamides consisting essentially of recurring units of the formula:

(I)
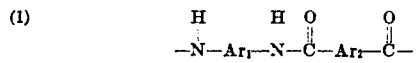

wherein $Ar_1$ is selected from the group consisting of:

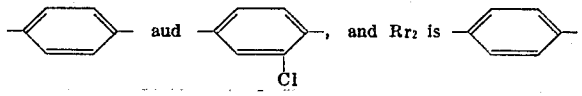

Homopolymers and copolymers of the above recurring units are included in the scope of this invention. These fibers have an initial modulus in excess of 170 gpd. and an orientation angle of up to 40° and/or a sonic velocity of at least about 4 km./sec.

Among the preferred polycarbonamides utilized herein are poly(p-phenylene terephthalamide),

and poly (2-chloro-p-phenylene terephthalamide),

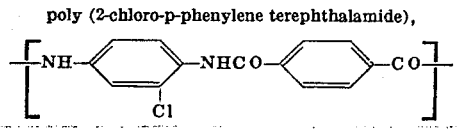

It is to be understood that the designation of position locations of substituent groups on the aromatic nuclei of the polycarbonamides described herein refers to the location(s) of the substituent(s) on the diamine, diacid or other coreactants from which the polyamide is prepared. Thus, the name given to any polyamide identified herein, also includes polymers resulting from random end-to-end distribution of diamine and diacid units. Similarly, the divalent radicals $Ar_1$ and $Ar_2$ in Formula (I) may form part of the structural unit as illustrated, and/or in reversed attachment. For example, when the polycarbonamide is prepared from 2-chloro-p-phenylenediamine and terephthalic acid, $Ar_1$ is

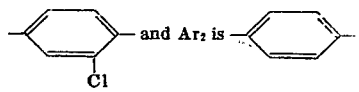

the Formula (I) structural unit will be

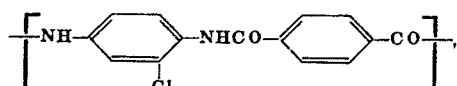

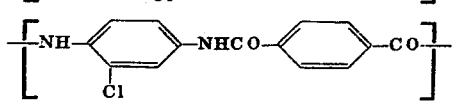

or a random distribution of both types of units.

The polymer chains described above consist essentially of carbonamide links (—CONH—) and aromatic ring nuclei as specified above in Formula (I). The phrase "consisting essentially of" is used herein to indicate that the polymer may also contain other recurring units not conforming to Formula (I) without changing the essential characteristics thereof for use in the practice of this invention; the mol (mole) percentage of such non-conforming comonomer units is dependent upon the type of unit. If the non-conforming comonomer units are aromatic carbonamide units whose chain extending bonds are coaxial or parallel and oppositely directed

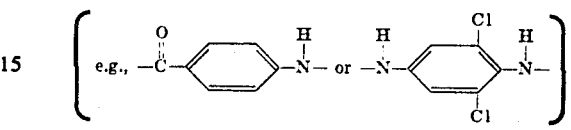

up to about 20 mol percent may be used. If other types of non-conforming comonomer units are used, the polymer generally may comprise up to about 10 mol percent thereof. To obtain the fullest advantage of the present invention, it is preferred that from about 0 to 5 mol percent of non-conforming comonomer units be present, particularly if (1) the chain-extending bonds are not coaxial or parallel and oppositely directed (e.g., meta), (2) the units are non-aromatic (e.g., aliphatic), (3) the units are from "bridged" reactants (e.g., bis(4-aminophenyl ether) and/or (4) the units are non-amide (e.g., urea or ester groups). As used herein, the mol percent of non-conforming comonomeric units is equivalent to the mol percent of comonomers employed which provide units in the chain different from

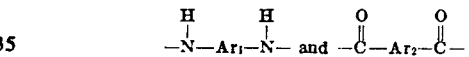

of Formula (I), above.

Representative comonomers are illustrated in the following examples. Among the preferred comonomer units may be named (with the preferred maximum mol percentages indicated): 5-methylisophthaloyl (5%), 5-chloroisophthaloyl (2.5%), 5-tert-butylisophthaloyl (2.5%), tetrachloroterephthaloyl (2.5%), 4-methyl-m-phenylenediimino (2.5%), 4,4'-diphenylenediimino (5%), 3,3'-dimethyl-4,4'-diphenylenediimino (5%), m-phenylenediimino (2.5%), m-phenylenediimino and isophthaloyl (total of 2.5%), 4,4'-diaminoazobenzene (5%), 4,4'-azodibenzoyl (4.5%), sebacyl (2.5%), diiminocarbonyl-p-phenyleneimino (5%), diiminocarbonyl-p- phenylenecarbonyldiimino (5%), p-benzamide (10%) and 4,4'-dibenzoyl (10%). Other suitable comonomers are disclosed in French Pat. No. 1,526,745. The most preferred comonomer units are those which are aromatic, have chain extending bonds which are coaxial or parallel and oppositely directed and/or are polyamide-forming units.

One or more of these polymers may suitably be used in the dopes and/or fibers of this invention, i.e., a single homopolymer; a single copolymer; or homopolymer and/or copolymer blends are suitable herein.

The novel filaments of this invention prepared from spin dopes which comprise the polycarbonamide, particular liquid media, and salt such as lithium chloride or calcium chloride, can be obtained by several techniques. For example, a particular dope may be extruded into filaments which, after being washed and dried, exhibit the unexpectedly high tensile properties characteristic of the filaments of this invention. In other instances, the freshly extruded filaments, washed and dried, may be heat treated as described hereinafter in order to produce the unusual levels of filament tensile properties.

The optically anisotropic liquid dopes of this invention, which exhibit different light transmission properties in different directions in microscopic liquid regions of the dope, may be prepared by combining critical amounts of the polycarbonamide, particular liquid media, and salt such as lithium chloride or calcium chloride. The freshly extruded fibers obtained from these dopes, in particular, exhibit desirable tensile properties. Generally, an anisotropic dope can be used to produce an as-extruded fiber of properties superior to those of fibers produced from an otherwise similar dope which is isotropic or less anisotropic (i.e., an emulsion of isotropic and anisotropic phases in which the isotropic phase is predominant. (See Example 16).

Polycarbonamides, as described above, of high molecular weight (i.e., having an inherent viscosity (as described hereinafter) of at least about 0.7, and preferably greater than about 1.0), are fiber forming and particularly useful herein. Lower inherent viscosity polymers may be utilized for films, fibrids and/or coatings. These polycarbonamides are thermally stable.

THE FIGURE

The FIGURE illustrates a typical relationship of viscosity and polymer concentration for the dopes of this invention, showing the critical concentration point. The plot is of a dope viscosity vs. polymer concentration curve wherein the polymer is poly(2-chloro-p-phenylene terephthalamide) of 3.68 inherent viscosity in a dimethylacetamide-lithium chloride system at 26.5° C. The salt concentration was 2.18 percent and viscosity was measured with a Brookfield Viscometer Type RVF with a No. 6 spindle at 10 r.p.m.

DESCRIPTION OF THE PREFERRED EMBODIMENTS

Polycarbonamide Preparation

The polycarbonamide useful in this invention may be prepared from appropriate coreactants by low temperature solution polymerization procedures (i.e., under 60° C.) similar to those shown in Kwolek et al. U.S. Pat. No. 3,063,966 for preparing poly(p-phenylene terephthalamide). These polycarbonamides may be prepared by causing one or more aromatic diamines selected from the group of p-phenylenediamine and 2-chloro-p-phenylenediamine to react with polyamide-forming derivatives of terephthalic acid, together with comonomers, if any. The terephthalic acid is conveniently employed in the form of its dihalide which is readily prepared by well-known methods; the diacid chloride is usually preferred. Preferably, these low temperature solution polymerizations are accomplished by first preparing a cooled solution of the diamine or diamines in a solvent or a mixture of solvents selected from the group of:
   hexamethylphosphoramide,
   N-methylpyrrolidone-2, and
   N,N-dimethylacetamide, and
   N,N,N',N'-tetramethylurea.
To this solution is added the diacid chloride and comonomers, if any, usually with stirring and cooling. Polymer precipitation frequently occurs within a few minutes and on other occasions the reaction mixture may gel. The polymerization may be stopped by agitating the reaction mixture with a polymer non-solvent, e.g., water, in a suitable blender. The polymer is collected, washed, and dried before being stored or subsequently processed into a dope.

Dope Preparation

The above-identified polycarbonamides are processed into useful dopes by several techniques. The polycarbonamide is generally isolated after its formation and then dispersed in a suitable medium to form a composition or dope (such embodiments will hereinafter be referred to as "isolated" polymer dopes). In particular embodiments, the polymerization media may be used in forming such compositions or dopes (such embodiments will hereafter be referred to as "in situ" polymer dopes).

A. Isolated Polymer Dopes

Isolated polycarbonamides useful in this invention having inherent viscosity in the range of 0.7–5.0 and even higher, may be combined with concentrated (95–98 percent) sulfuric acid or oleum at room temperature to form dopes with from about 1 to 25 percent polymer content which may be wet extruded into films or extruded into fibers by wet-spinning procedures.

Other dopes useful for fiber formation comprise about 5–25 percent by weight of an isolated polycarbonamide of this invention and exhibit an inherent viscosity within the range of about 0.7–5.0, from 0.5–8 percent by weight lithium chloride or calcium chloride and from 67–94 percent by weight of a liquid or mixture of liquids selected from the class of:
   hexamethylphosphoramide,
   N-methylpyrrolidone-2,
   N,N-dimethylacetamide.
   N,N,N',N'-tetramethylurea (TMU)
   and tetramethylene sulfoxide.

Dopes useful for film formation preferably comprise from about 2–20 percent by weight of the isolated polycarbonamide, 0.5–5 percent by weight lithium chloride, and the balance of a liquid or mixture of liquids, as above. These dopes may be prepared by stirring the combined ingredients for up to 12 hrs., using external cooling to maintain the temperature at about 25° C., after which the dopes are wet cast into films or extruded into fibers by conventional methods. A preferred combination for dope preparation for poly(p-phenylene terephthalamide) comprises a hexamethylphosphoramide/N-methylpyrrolidone-2 mixture wherein the respective amides are in a volume ratio of 2/1.

B. In Situ Polymer Dopes

Useful dopes may also be obtained by in situ polymerization of members of the above-cited class of polycarbonamides with or without neutralization of the acidic by-product of the polymerization. For example, an acidic dope of poly(p-phenylene terephthalamide) suitable for spinning may be prepared by reacting p-phenylenediamine and terephthaloyl chloride, in e.g., a mixture of hexamethylphosphoramide/N-methylpyrrolidone-2 (2/1, V/V), using external cooling to maintain the reaction temperature in the range of about 40° C. and using a chain terminator such as excess p-phenylenediamine, p-aminobenzoic acid, benzoyl chloride, aniline, and the like, when needed to control molecular weight. A neutralized spin dope may be prepared in N,N-dimethylacetamide by adding to the polymer-containing dope a quantity of a suitable basic agent (e.g., lithium carbonate, lithium hydroxide, lithium oxide, calcium oxide, calcium hydroxide) sufficient to neutralize the acidic by-product of the polymerization.

Preparation of a fluid dope may be assisted by addition of lithium chloride to the reaction mixture, by the application of heat, and by vigorous agitation of the reaction mixture.

The use of additives, as described above, is preferred in many of the dopes of this invention. It is believed that particular additives aid the solvation of the polyamide in the liquid medium. For the amide and urea media, it is highly desirable that at least about 2.0 weight percent of lithium chloride and/or calcium chloride be added to provide a reasonably concentrated dope from particular isolated polymers. In the preparation of amide or urea in situ dopes, the salt may be added before, during or after the polymerization, or preferably by forming it as a by-product of a neutralization (e.g., when the monomers are p-phenylenediamine and terephthaloyl chloride and the neutralization agent is lithium carbonate, a by-product of the neutralization reaction is lithium chloride). In the preparation of an amide or urea dope from isolated polymer, the salt may be conveniently added to the polymer and/or liquid medium. In either type of dope (isolated or in situ) salt in excess of about 20 weight percent is generally neither necessary nor desired, less than about 15 weight percent is preferred, about 2 to 4 weight percent being most preferred.

Although the dopes consist essentially of the polymer and the liquid medium (including additive, if any), additional substances may be present in the dope, such as small amounts of inert organic liquids (e.g. tetrahydrofuran, dioxane, benzene or acetonitrile) used to disperse the monomer in the amide or urea dopes, water (either purposefully added or adventitiously present) and the acidic by-product of the polymerization reaction (e.g., if less than the stoichiometric amount of a neutralization agent is used).

The usual additives such as dyes, fillers, delusterants, UV stabilizers, antioxidants, etc., can be incorporated with the polymer or copolymer or dispersed in the dopes of this invention for the purposes intended, prior to the preparation of shaped articles thereof.

Dopes of this invention may be conveniently prepared e.g., by combining polymer and the liquid medium (and additives, if any) in a conventional manner (e.g., with stirring). Some dopes are formed at room temperature conditions and are useful (e.g., spinnable) under these conditions. Other dopes require specific heating techniques, i.e., flowable compositions may be obtained at room temperature in many instances, while heating, preferably with stirring, and sometimes heating and cooling cycles are required in a few instances. The amount of heating and/or cooling required to form a useful dope or composition varies with the liquid medium, the polymer (the composition, the inherent viscosity, the crystallinity, and the particle size of the polymer sample employed) and the quality of the stirring action. In the preparation of these dopes, care must be taken to avoid local overheating and formation of a "dry" or gelled spot at the meniscus of this composition or on the walls of the vessel being employed. Such portions of polymer frequently do not readily redissolve. Numerous suitable techniques useful in preparing specific dopes of this invention are illustrated in the Examples.

The anisotropic dopes of the invention may comprise a single anisotropic phase, or an emulsion of anisotropic and isotropic phases in any proportion or degree of dispersion. The isotropic dopes also useful in preparing fibers of this invention comprise a single anisotropic phase. Minute quantities of undissolved polymer may be present in these phases or in the emulsion, particularly when the dope is prepared by dissolving isolated polymer. A "dope" is a shaped-structure-forming (e.g., fiber-forming, film-forming, or fibrid-forming) polymer-solvent system which comprises at least one of the above phases.

When the dope-forming ingredients of this invention are combined in particular concentration ranges, the resultant dopes are optically anisotropic, i.e., microscopic regions of a given dope are birefringent; a bulk dope sample depolarizes plane-polarized light (described hereinafter), sometimes referred to herein as light or polarized light, because the light transmission properties of the microscopic areas of the dope vary with direction. This characteristic is associated with the existence of at least part of the dope in the liquid crystalline or mesomorphic state. As described in *Industrial Research*, G. H. Brown, May, 1966, pp. 53–57, liquid crystals are intermediate between the liquid and solid states in many of their properties. Thus, they have unique structural arrangements partially imparting the order of crystals and the fluidity of liquids.

Optically Anisotropic Dopes

The dopes of this invention exhibit anisotropy while in the relaxed state. Although conventional polyamide dopes may depolarize plane-polarized light when subjected to appreciable shear (e.g., flow birefringence wherein molecules in a solution are hydrodynamically oriented), static (i.e., stationary) samples of the dopes of this invention uniquely exhibit this phenomenon.

The extended stiff-chain aromatic polymers which are present in the anisotropic dopes of this invention are believed to be in essentially rod-like entities (aggregates or bundles) in the liquid medium. This extended, stiff-chain configuration of the polymer is indicated by values of the exponent, $\alpha$, in the Mark-Houwink relationship, $[\eta]=KM^{\alpha}$, for dilute solutions of lower molecular weight polymer. In this well-known relationship, $[\eta]$ is the intrinsic viscosity, M is the molecular weight, and K and $\alpha$ are constants for a given polymer/solvent system. The great majority of polymers for which this relationship has been evaluated in the literature have had values below 0.9. Among the polymers used in the dopes of this invention, poly(p-phenylene terephthalamide) is determined to have an $\alpha$ value of 1.16, measured on unfractionated polymer with an intrinsic viscosity in the range of 0.7 to 25.0 and weight average molecular weight determination made in sulfuric acid (95–98 percent by weight).

When a given system exceeds a certain "critical concentration point," an anisotropic phase is formed which gives rise to the characteristics of the anisotropic dopes of this invention.

For a given polyamide/liquid medium dope of this invention, below a particular polyamide concentration, the dope is isotropic. As the concentration of the polyamide increases, the viscosity of the dope increases. However, at a point referred to herein in as the "critical concentration point" there is a sharp discontinuity in the slope of the viscosity vs. concentration curve when the dope changes from isotropic to partially anisotropic without the formation of a solid phase. Further addition of polyamide results in a decrease in the viscosity of the dope, as the dopes become more anisotropic.

As previously stated, a given dope of this invention is anisotropic when the ingredients of the dope are present in particular concentration ranges. There is a complex relationship existing among the concentration of the polymer or copolymer, the inherent viscosity thereof, and the temperature which generally determines the ranges in which a given polymer or copolymer/liquid medium dope is anisotropic.

The "critical concentration point" varies with the particular polyamide, as well as the weight percent and the inherent viscosity thereof, the particular liquid medium and the temperature.

These anisotropic dopes are structurally and functionally distinct from known aromatic polyamide "solutions" and are uniquely suited for the preparation of high strength shaped articles (e.g., fibers) often without post-shaping treatment (e.g., drawing).

One provision of the present invention is a class of optically anisotropic dopes consisting essentially of:
 poly(2-chloro-p-phenylene terephthalamide);
salt selected from:
 lithium chloride and
 calcium chloride;
and at least one liquid selected from:
 N,N-dimethylacetamide,
 hexamethylphosphoramide,
 N-methylpyrrolidone-2, and
 N,N,N',N'-tetramethylurea.
The polycarbonamide is present in a concentration above the "critical concentration point."

Another provision of the present invention is a class of optically anisotropic dopes consisting of:
 poly(p-phenylene terephthalamide);
salt selected from:
 lithium chloride and
 calcium chloride;
and a liquid medium consisting essentially of:
 25 to 67 weight percent of hexamethylphosphoramide
 with the balance being at least one amide
 medium selected from N,N-dimethylacetamide and
 N-methylpyrrolidone-2.
The polycarbonamide is present in a concentration above the critical concentration point. These dopes in addition to their unique anisotropic nature, possess further uniqueness in that none of the above amide media provide anisotropic dopes when used individually, although mixtures thereof do so.

One preferred spinnable anisotropic dope of this class comprises about 5–15% by weight poly(p-phenylene terephthalamide) whose inherent viscosity is in the range of about 0.7–5.0, from 0.5 percent to up to 5 percent by weight lithium chloride, and the balance of a mixture of hexamethylphosphoramide and N-methylpyrrolidone-2 containing 33 to 67% by volume of hexamethylphosphoramide. The relative amounts of these ingredients, particularly those of the hexamethylphosphoramide and N-methylpyrrolidone-2, contribute to the ease with which these spin dopes are obtained. For instance, as illustrated in the examples which follow, a spin dope fluid at room temperature is obtained from these ingredients when a particular amide mixture is employed. However, when a different amide mixture containing more hexamethylphosphoramide is employed with the same amounts of the polymer and salt, the combined ingredients must be heated to at least about 35° C. to achieve a fluid dope whose birefringence may be observed. It is significant to distinguish between a fluid dispersion and a liquid dope. That is, at 35° C. the dope is two liquid phases, whereas at room temperature, it is fluid but contains a dispersed solid (birefringent) phase. Preparation of the dopes is preferably undertaken by vigorous mixing of the ingredients and low temperatures, e.g., as low as 0° to −10° C.

Another preferred spinnable anisotropic dope comprises about 4-25 percent by weight poly(2-chloro-p-phenylene terephthalamide) whose inherent viscosity is in the range of about 0.7-4.5 from 0.5 to 8 percent by weight of lithium chloride and the balance being N,N-dimethylacetamide. In addition, anisotropic dopes comprising (1) poly(2-chloro-p-phenylene terephthalamide), lithium chloride, and N,N,N',N'-tetramethylurea (TMU) and (2) the same polymer with N,N-dimethylacetamide and calcium chloride can be prepared. For example, an anisotropic dope is prepared by combining 2.5 g. of poly(2-chloro-p-phenylene terephthalamide) ($\eta inh = 1.27$) with 25 ml. of a mixture prepared from 3.56 g. of lithium chloride and 100 ml. of TMU. This dope produces a bright field in a polarizing microscope and displays transmittance value (T) of 81 as measured herein.

An anisotropic dope is also prepared by combining 3.0 g. of poly(2-chloro-p-phenylene terephthalamide) ($\eta inh = 1.27$) with 25 ml. of N,N-dimethylacetamide and 0.75 g. of $CaCl_2$. After these ingredients are mixed in a shaker, an anisotropic dope is obtained since it displays a transmittance value (T) of 88 as measured herein.

There is a complex relationship existing among the amount of poly(2-chloro-p-phenylene terephthalamide) and the inherent viscosity thereof, the amount of salt, and the amount(s) of amide(s) that determine whether or not a given dope preparation is optically anisotropic under otherwise constant conditions. By way of illustration, an isotropic dope may be converted to an anisotropic dope by changing the polymer concentration. For example, a clear dope comprising 10 g. of poly(2-chloro-p-phenylene terephthalamide), $\eta inh=1.13$, in 100 ml. of a mixture of 100 ml. of N,N-dimethylacetamide and 4.3 g. of lithium chloride is isotropic. However, when an additional 10 g. of the polymer is added thereto, the resulting dope becomes turbid and anisotropic as shown by light depolarization studies. That the amount of salt present in the dope contributes to the nature of the dope is demonstrated by observing that a dope comprising 20 g. of poly(2-chloro-p-phenylene terephthalamide), $\eta inh=1.13$, and 100 ml. of a mixture of 100 ml. of N,N-dimethylacetamide and 7 g. of lithium chloride is isotropic.

Dopes comprising poly(2-chloro-p-phenylene terephthalamide) can be separated in two layers, an isotropic upper layer and a more dense anisotropic lower layer. This separation can be achieved by, e.g., permitting a spin dope to stand for a period of time sufficient to achieve the separation (e.g., one week) or by, e.g., centrifugation. Just as an isotropic poly(2-chloro-p-phenylene terephthalamide) dope can be converted to an anisotropic dope by changing polymer concentration at constant polymer inherent viscosity, a change in the volume of a given anisotropic phase in a two-layer dope system can be attained by incorporating in the dope a polymer of higher inherent viscosity. For example, a dope comprising 10 g. of poly(2-chloro-p-phenylene terephthalamide), $\eta inh=1.13$, in 100 ml. of a mixture obtained by combining 100 ml. of N,N-dimethylacetamide and 3.12 g. of lithium chloride separates into two layers on standing. The bottom layer is 20 percent the total volume. When the dope is prepared with 10 g. of this polymer with an inherent viscosity of 1.85, the anisotropic bottom layer constitutes 33 percent of the total volume.

It has been observed that the maximum amount of salt which may be used in order to have an anisotropic dope of this polymer increases as the inherent viscosity of the polymer employed to prepare the dope increases.

It is to be understood that the combinations of the aforesaid ingredients are chosen to provide an anisotropic dope; certain combinations of ingredients may not so provide. Whether a given dope is anisotropic is readily determined by the methods described hereinafter.

The anisotropic dopes of this invention are not suggested in the prior art. Anisotropy also characterizes novel dopes of a class of carbocyclic aromatic polyamides whose chain-extending bonds from each aromatic nucleus are para-oriented and/or essentially coaxial or parallel and oppositely directed, which are disclosed and claimed in copending, commonly assigned application Ser. No. 827,345. However, the dopes of this invention additionally possess further unique characteristics not possessed by the entire class of anisotropic dopes of application Ser. No. 827,345. In particular, the poly(2-chloro-p-phenylene terephthalamide) dopes have highly desirable "solution" characteristics, i.e., they can be prepared with a high solids content or with high viscosity polymer in the aforementioned amide and urea media and provide stable dopes at room temperature. The poly(p-phenylene terephthalamide) dopes also have highly desirable "solution" stability at room temperature, as well as its unique "solubility" in mixtures of non-solvents as described hereinbefore.

Determination of Optical Anisotropy

In the examples which follow, the anisotropic character of the dopes of this invention is described in terms of e.g., (1) by plotting the relationship of dope viscosity vs. polymer concentration to determine the "critical concentration point," (2) by numerical values of transmittance of light through crossed polarizers, identified as "T," (3) an observation of the bright field observed in a polarizing microscope, and (4) a visual determination of "stir opalescence."

Critical Concentration Point

A "critical concentration point" characterizes the anisotropic dopes of this invention, i.e., there is a sharp discontinuity in the slope of the dope viscosity v. polymer concentration curve. When the concentration exceeds this point, the dope is anisotropic and further addition of polymer results in a decrease in the viscosity as the dope becomes more anisotropic. This "point" (as well as the complete viscosity vs. concentration curve) is routinely determined using conventional concentration and viscosity measuring techniques. For example, a polymer dope of this invention may be placed in a polyallomer test tube equipped with a Teflon TFE-fluorocarbon cap through which a viscometer spindle extends into the dope, constant temperature being maintained. The viscosity of the stirred dope may be conventionally measured with a viscometer (e.g., a Brookfield Syncho-Lectric Viscometer, Model RV, product of the Brookfield Engineering Laboratories, Inc., Staughton, Mass., or equivalent). Viscosity measurements are made at the initial polymer concentration and at higher concentrations (i.e., after an additional known amount of polymer is added). By this technique (or equivalent) a viscosity vs. concentration curve may be plotted for this system (the given polymer and liquid medium at that temperature) and the critical concentration point (i.e., the discontinuity in the slope of the curve) is determined.

"T" Test

The determination of the "T" value may be made by placing an anisotropic dope of this invention, prepared as described herein and containing no suspended solid matter, between a crossed polarizer and an analyzer. The dope sample is conveniently employed as a layer 80 $\mu$ thick. Thus, a drop taken from the interior of a dope sample of this invention is put on a dry, clean strain-free glass slide; a square cover of glass, supported on one edge by a glass tube or wire of known thickness (1.3 mm. diameter is convenient), is pressed down on the drop so as to form the roof of a liquid wedge. The edges are sealed with a fast-drying binder (e.g., Duco cement, DuPont's registered trademark for a transparent, flexible, waterproof adhesive), avoiding actual contact with the dope. The sharp edge of the wedge is sealed by excess dope which is squeezed out. In the operation, common care should be taken to avoid evaporation, moisture uptake, excessive shearing actions, dirt, and any suspended solid particles.

The samples are allowed to stand for a sufficient time to permit relaxation of the shear stresses resulting from the slide preparation to assure that the sample is static. The amide or urea dopes are relaxed about 10 minutes; up to about 1½ hours or longer is generally needed to relax sulfuric acid dopes (especially the more viscous samples).

The wedge is positioned in a light beam, on a microscope stage between crossed polarizer and analyzer. The light beam has the intensity such as is ordinarily used in microscopic examinations. The wedge is positioned so that the thickness of the center of the layer of dope through which the light beam passes is $80\mu$ in thickness. The intensity is measured with polarizer and analyzer crossed ($I_+^s$) (superscript s to denote sample present in wedge) and with analyzer removed ($I_-^s$) and the difference $I_-^s - I_+^s$ is obtained. The transmitted light may be measured by conventional light sensitive detectors (e.g., by photo multipliers, selenium or cadmium light meters, bolometers, etc.). The same measurements are then made on a similarly constructed wedge containing air, and the difference $I_-^c - I_+^c$ (superscript c for control) is recorded. When the dopes of this invention are placed in the wedge the expression ($I_-^s - I_+^s$) – ($I_-^c - I_+^c$) will be greater than zero and greater than can be accounted for by experimental error, using reasonable care and accurate instrumentation. It represents the increase in light transmittance through the analyzer due to the presence of the sample. The magnitude of ($I_-^s - I_+^s$) – ($I_-^c - I_+^c$) will vary with the solvent being used, polymer concentration, concentration of dissolved salt, and the units in which light intensity is measured.

In the examples, an apparatus by which the anisotropic character, or "T" value, of the dopes is determined consists essentially of an A. O. Spencer Orthoscope Illuminator which contains a tungsten overvoltage microscope lamp (color temperature 3,800° K.), an optical wedge containing the sample, an optical wedge containing air, a Bausch and Lomb Polarizing Microscope having a Leitz 10X objective and a Leitz 10X ocular Periplan, a Gossen "Sinarsix" exposure meter and a Polaroid MP3 Industrial Land Camera body. The wedge containing the sample is prepared as previously described and is positioned on the microscope stage (i.e., between the polarizer and the analyzer) to provide a sample layer 80 $\mu$ thick in the path of any light which reaches the analyzer and the light meter. The polarizer and the analyzer are adjusted to provide 90° crossed polarization planes. Light from the lamp which passes the analyzer by the route previously described is projected into the camera body and is measured in the image plane (at the ground glass level) by the exposure meter ($I_+^s$). The same measurement is made with the analyzer removed ($I_-^s$). This is repeated with the control wedge of air 80 $\mu$ thick to give $I_+^c$ and $I_-^c$. The light values from the "Sinarsix" exposure meter, which are expressed in logarithmic units to the base 2, may be converted to logarithmic units to the base 10 by multiplying them by 0.301 (i.e., by log 2); the antilogs$_{10}$ of these products are then determined. These antilog values are designated $I_+^{s'}, I_-^{s'}, I_+^{c'},$ and $I_-^{c'}$. Comparative intensity measurements, free from the particular intensity units, are conveniently stated in terms of relative intensities (i.e., intensity ratios or fractions of transmitted light intensities). The expression $I_+^{s'}/I_-^{s'}$ is the fraction of light intensities transmitted by the dope being examined. The fraction $I_+^{c'}/I_-^{c'}$ is the fraction of light transmitted by the control wedge. The difference $(I_+^{s'}/I_-^{s'}) - (I_+^{c'}/I_-^{c'})$ represents the increase in intensity of light transmitted due to the presence in the wedge of the dope being examined.

Since, for a depolarizing sample, the theoretical maximum value of $I_+^{s'}/I_-^{s'} - I_+^{c'}/I_-^{c'} = 0.5$, and index of the increase of light transmittance (T) may be conveniently taken as $2(I_+^{s'}/I_-^{s'} - I_+^{c'}/I_-^{c'}) \times 100$ since in this way the maximum value is 100. When measured according to the foregoing procedures, dopes having values greater than 2, preferably greater than 4, are considered herein to be anisotropic in nature.

Observation Between Light Polarizing Elements

The "T" test described above, quantitatively describes the light transmittance of anisotropic dopes. However, a qualitative determination can also be conveniently made using a light source, analyzer and crossed polarizer (or equivalents thereof) as described in these tests. When such polarizing elements are crossed, a static (relaxed) dope sample placed between the polarizer and analyzer will transmit essentially no light if the dope is isotropic. However, when the sample is anisotropic, light will be transmitted and a relatively bright field will be observed (the intensity of the light being related to the degree of anisotropy of the sample).

Stir Opalescence

"Stir opalescence" is a term used herein to describe a property characteristic of anisotropic dopes which is visually observed with the naked eye. Many of the dopes of this invention, when observed in bulk in a transparent vessel, appear turbid or hazy and yet they contain no, or practically no, undissolved solid. When the dope, seen under reflected ordinary light, is disturbed by tilting or rolling of the vessel or by only slow stirring, there is produced a characteristic, readily-observed, satin-like sheen or glow which is observed even after the disturbance ceases and which decreases in intensity thereafter. With some compositions there is produced no sense of color while others may have a bluish tone or even a degree of varegated color, which is described by observers as having a pearly or opalescent quality. Extraneous color in the dope, such as yellows from minor impurities or inherent in some polymers, modifies the observation of color developed under shear. Dopes, which are disturbed as described above, often give the appearance of having striations and/or graininess in the surface. These visual effects are observed in anisotropic dopes of this invention. While such effects do not conclusively establish that the dope is anisotropic, such dopes generally are anisotropic or will become anisotropic upon the addition of more polymer (providing solubility limits permit). For the sake of brevity, the visual observation of all variations of the phenomenon outlined above is referred to in the examples as the exhibition of "stir opalescence."

Dopes described as anisotropic hereinafter may have shown this "stir opalescense" effect or may have been shown to be anisotropic by the aforementioned qualitative or quantitative techniques, i.e., the critical concentration point is determined or the sample is observed (between light polarizing elements, as in a microscope) to depolarize plane-polarized light, either qualitatively or quantitatively, as described hereinbefore. Any of the above-described qualitative or quantitative techniques suitably indicate anisotropy, although one or more of such techniques may be more convenient and/or accurate for a given dope. The determination of "critical concentration point" is the preferred test for determining anisotropy because it is conveniently and accurately used for all anisotropic dopes of this invention. The qualitative test (visual observation between light polarizing elements) is preferred for the convenience in testing a large number of samples. The "stir opalescence" observation is also convenient and generally indicates anisotropy. Among the quantitative tests (other than the critical concentration point determination), the "T" test is generally preferred.

Utility of the Dopes - Fiber Preparation

The previously described compositions or dopes of this invention can readily be utilized for the production of fibers, films, fibrids, and coatings.

Dopes of this invention containing at least 4 percent by weight of polymer are preferred in that they are particularly useful in preparing fibers. Although these anisotropic dopes are useful in preparing other shaped articles, the preferred use of these dopes (as well as related isotropic dopes) is in the preparation of fibers by conventional techniques and/or techniques described herein. The term "fibers" is used generically herein to include the numerous conventional fiber structures. For example, the fibers may be of staple or continuous lengths. Similarly, the fiber may consist of a single component or multicomponents (e.g., a bicomponent fiber with the two components consisting of different polyamide compositions of this invention). Furthermore, one or more polyamide compositions of this invention may be in a given fiber (or fiber component) i.e., the fiber may contain a single polyamide composition or blends of two or more of such compositions. The fibers may be employed in single strands or multi-fiber bundles (e.g., yarns). All such conventional fiber structures which consist essentially of the polyamide compositions specified herein, having the internal structure and properties specified herein, are contemplated herein.

The dopes are extruded into fibers by conventional wet- and dry-spinning techniques and equipment. In wet spinning, an appropriately prepared composition containing the polymer and, e.g., an amide or urea medium, whose temperature may vary from 0° C. to about 100° C., is extruded into a suitable coagulating bath, e.g., a water bath maintained at 0°–90° C., depending on the solvent used in the preparation of the dope. Other useful coagulants include ethylene glycol, glycerol, alcohols, mixtures of water, methanol, and an amide or urea solvent, mixtures of water and alcohols and aqueous salt baths, e.g., maintained at a temperature of about −20° to +90° C. Dry spinning may be accomplished by extruding the compositions or dopes of this invention, into a heated current of gas whereby evaporation occurs and filaments of the polyamide are formed.

After being formed, the fibers may be passed over a finish-application roll and wound up on bobbins. Development of maximum levels of fiber and yarn properties may be assisted by soaking the bobbins in water or in mixtures of water and water-miscible inert organic liquids, (e.g., acetone, ethyl alcohol, glycerol, N,N,N', N'-tetramethylurea, N,N-dimethylacetamide) to remove residual amide liquid and salt or acidic solvents followed by drying. Removal of the residual solvents and/or salts may also be accomplished by passing the fiber or yarn through aqueous baths on the run, by flushing the bobbins with water as yarn is formed, and by washing or soaking skeins, rather than bobbins, of yarn. Dry-spun yarn may be strengthened by washing with even a minor amount of water.

The fibers prepared from the anisotropic compositions or dopes of this invention and related isotropic dopes, are characterized by a unique internal structure and exceptionally high tensile properties, either as extruded or after being heat treated.

This unique internal structure of the fiber is evidenced by its low orientation angle and/or high sonic velocity. The physical meaning of orientation angle is that it establishes an angle (i.e., one-half of the orientation angle) about the fiber axis in which a given percentage of crystallites are aligned. In the fiber of the present invention, a high percentage (i.e.,) greater than about 50 percent, generally about 77 percent) of the crystallites are aligned within this angle (one-half of the orientation angle) about the fiber axis; this percentage is determined from an intensity trace of the fiber's diffraction pattern (as described hereinafter). For example, the intensity trace is an essentially Gaussian curve for most of the fibers of this invention (i.e., essentially all of the heat-treated fibers and most of the as-extruded fibers). For such a curve, about 77 percent of the diffraction intensity falls within this angle and this is interpreted as showing that a like percentage of crystallites is aligned within this angle. For the few fibers (e.g., some of the as-extruded fibers) for which the curve may not be Gaussian-like (e.g., the curve may be a composite of several curves exhibiting partially resolved peaks), greater than about 50 percent of the crystallites are aligned within this angle, (see Example 19).

Orientation angle and/or sonic velocity demonstrate the unique internal structure of the fiber. These structural parameters each relate to orientation and each evidence the uniqueness thereof. Sonic velocity is a measure of the total molecular orientation as contrasted with crystalline orientation. This total molecular orientation differs from the orientation described by orientation angle, i.e., orientation angle is a measure of crystallite orientation determined by X-ray measurements. The unique internal structure of the fibers of this invention is evidenced by either or both of these orientation parameters; each parameter suitably describes the uniqueness and the parameters are correlated for the fibers of this invention.

The unique internal structure of the fibers of this invention is believed to be responsible for the exceptionally high tensile properties thereof. For fibers of this invention as the orientation angle decreases and/or the sonic velocity increases, the initial modulus increases.

In general, as shown in the examples which follow, fibers of this invention possess these high tensile properties "as-spun" or "as-extruded." "As-spun" or "as-extruded" fibers of this invention are defined as those formed in the normal processes of spinning (i.e., forming, shaping, or finishing steps), but which are not submitted to a drawing (elongation) or heat-treating operation which changes the molecular order or arrangement of polymer molecules. However, the fibers may be subjected to washing and drying operations needed to remove solvents or impurities. Other operations which may be carried out without changing the fundamental character of the fibers include (1) application of finishes, dyes, coatings, or adhesives; (2) physically treating the fiber by twisting, crimping, cutting into staple; (3) using the fiber in forming shaped objects, fabrics, papers, resin or rubber composites; etc.

As-extruded fibers of this invention are preferred for particular end uses e.g., tire cord. For such uses, it is generally desirable that, in addition to high modulus and tenacity value, the fiber exhibits elongation of at about 5 percent. However, post-shaping treatments (e.g., heat treatment) which improve the modulus and tenacity, often do reduce the elongation (e.g., to below 5 percent). Since particular preferred fibers of this invention possess desirably high moduli and tenacities as-extruded, and exhibit elongation values of at least about 5 percent, these as-extruded fibers are well suited for such end uses.

The as-extruded tensile properties of both the wet- and dry-spun as-extruded fibers can be enhanced by subjecting the undrawn fibers to a heat treatment. Hot air ovens, hot pins, hot slots, hot plates, liquid heating baths are useful for such treatments. The tensile properties (modulus and tenacity) of the as-extruded fibers are preferably enhanced by heating the fibers while they are maintained in a relaxed state (i.e., under no tension) or maintained under tension (either sufficient to maintain the fibers taut or to draw them); or by heating them after they are maintained under tension. In these heat treatments, the fibers generally do not appreciably contract (i.e., they contract less than about 1 percent) even when not under tension, but instead the length of the fibers is maintained between about 0.99X and 1.5X of their as-spun length, i.e., the fibers remain of essentially constant length or elongate less than about 1.5X. It is preferred that the fibers be under sufficient tension to elongate them at least 1.01X, i.e., the tension causes the fibers to stretch or be drawn at least this amount. The heating is within a range of about 200°–1,000° C., preferably 200°–650° C., most preferably 300°–600° C., for from 0.1 second to 5 minutes, preferably 0.1–10 seconds as subsequently shown. The fibers may be heated in various forms (e.g., fibers in staple or continuous lengths, yarns or fabrics). The fibers (e.g., in individual fiber form or yarn form) can be relaxed by supporting them, e.g., on a conveyor belt, during heating; tension on such structures can be provided by conventional means (e.g., between pairs of rolls driven at different speeds). When the fibers are in fabric form, tension on the fibers may be provided, at least in part, by the fabric construction. The lower temperatures within the above ranges are most preferred for poly(2-chloro-phenylene terephthalamide).

The fibers of this invention possess excellent chemical and thermal properties. They retain their tensile properties after being heated and boiled for 0.5 hr. in aqueous hydrochloric acid (1 percent) and caustic (1 percent) solutions. The fibers are essentially unaffected after being soaked for 1 hr. at 60° C. in commercially used dry cleaning solvents such as perchloroethylene and trichloroethylene. The fibers are self-extinguishing when they are removed from an open flame.

The excellent tensile properties of the fibers of this invention make them especially useful as reinforcing agents for plastics (i.e., reinforced plastic laminates), tire cord, V-belts, etc., because of their high initial modulus, strength, and thermal stability, specific end-uses for laminates may include skis, bows, fishing rods and golf club shafts.

The compositions or dopes of this invention may be formed into films by a conventional wet-extrusion method; such films are usually kept under restraint when they are subsequently dried and washed. Compositions prepared in the above-described manner also may be formed into fibrids (which can be pressed into papers) by shear-precipitation techniques (e.g., as described in Morgan U.S. Pat. No. 2,999,788), or applied as a liquid coating to a variety of substrates which may be in the form of sheets, papers, wires, screens, fibers, fabrics, foams, solid or microporous objects, etc. The substrates may be glass, ceramics, brick, concrete, metal (e.g., copper, steel, aluminum, brass), wood and other cellulosic materials, wool, polyamides, polyesters, polyacrylonitrile, polyolefins, polyvinylhalides, cured epoxy resins, cured aldehyde-urea resins, etc.

High Strength Fibers

High strength fibers prepared from the above-described dopes constitute another provision of the present invention. These fibers, comprised of the previously described polycarbonamides, exhibit initial modulus values in excess of about 170 gpd. and exhibit orientation angles of less than about 40°. As shown in the examples which follow, the novel fibers of this invention can be obtained as the products of the direct extrusion of the above-described dopes, or they are obtained by heat treatment as described above.

This unique internal structure of the fiber is evidenced by the fiber exhibiting a low orientation angle and/or high sonic velocity. Fibers of this invention exhibit orientation angles of less than about 40° and preferably less than about 35°, measured as described hereinafter and/or sonic velocity values of at least about 4 km./sec., preferably at least about 6 km./sec., most preferably, at least about 7 km./sec., measured as described hereinafter.

The fiber possesses outstanding tensile properties, in particular, an initial modulus of at least about 170 gpd. and preferably at least about 200 gpd., more preferably greater than about 300 gpd., most preferably greater than 400 gpd. and/or a tenacity at least about 5 gpd. Preferred as-extruded fiber of this invention exhibits an elongation of at least about 5 percent, in addition to high initial modulus and tenacity.

The modulus and orientation of the fibers of this invention are unexpectedly higher than that suggested in the prior art. Desirable modulus and orientation values are also characteristic of a class of novel fibers of carbocyclic aromatic polyamides, referred to above, which is disclosed and claimed in copending, commonly assigned application Ser. No. 827,345. However, the fibers of this invention additionally possess further unique characteristics not possessed by the entire class of fibers of application Ser. No. 827,345. In particular, the poly(2-chloro-p-phenylene terephthalamide) fibers possess highly desirable (1) burning resistance including low smoke generation, (2) property retention after exposure to harsh environmental conditions and (3) high tenacity at lower levels of fiber orientation, all as more fully described hereinafter. The poly(p-phenylene terephthalamide) fibers possess highly desirable flex life, as more fully described hereinafter.

Fabrics prepared from the poly(2-chloro-p-phenylene terephthalamide) fibers of this invention exhibit excellent resistance to burning as shown by the high limiting oxygen index (LOI) values obtained. LOI is defined [Modern Plastics, 44 (3) 141 ff (1966)] as the minimal volume fraction of oxygen in a slowly rising gaseous atmosphere that will sustain the candle-like burning of a stick of polymer. Values have been published for cotton textile materials finished with flame retardants [Text. Res J., 40, 203–210 (1970)]. The LOI test is performed with an instrument whose design is modeled on the General Electric Flammability Index Tester, but which has been developed for use with films and fabrics. The instrument contains carefully calibrated rotometers (which replace the orifices and line pressure gauges of the General Electric Tester) to control the amounts of oxygen and nitrogen which enter the burning chamber or chimney during the test. Poly(2-chloro-p-phenylene terephthalamide) fiber exhibits suitably high LOI values; for example, a twill fabric (5.31 oz./yd.$^2$) thereof exhibits an LOI value of 0.325 and shows low shrinkage during the test. This LOI value is desirably high; a value of about 0.27 or higher is considered "self-extinguishing." Poly(2-chloro-p-phenylene terephthalamide) fibers also generate little smoke when evaluated by a procedure similar to that reported in the technical publication ASTM-STP 422 (1966) by D. Gross et al.

The poly(2-chloro-p-phenylene terephthalamide) fibers of this invention exhibit outstanding stability to harsh environmental conditions. This stability is demonstrated by their excellent retention of tensile properties after prolonged exposure to (1) hot, concentrated sulfuric acid solutions (e.g., a yarn sample retains 87 percent of original tenacity (11.9 g./d.) after 3 hrs. exposure to 60 percent sulfuric acid at 80° C.), (2) hot, concentrated caustic solutions (e.g., a fiber sample retains 55 percent of original tenacity after 3 hrs. exposure at 80° C.), and (3) air atmosphere heated to 280° C. (e.g., a fiber sample retains 75 percent of original tenacity after 48 hours exposure in an air atmosphere at 280° C.).

The poly(2-chloro-p-phenylene terephthalamide) fibers of this invention exhibit a high level of tenacity for the degree of orientation present in the fibers. Increasing the degree of orientation increases tenacity, but generally results in poorer transverse properties. These fibers of the present invention can provide desirably high levels of both tenacity and transverse properties.

The poly(p-phenylene terephthalamide) fibers of his invention exhibit desirably long flex life, e.g., as determined by the procedure in U.S. Pat. No. 3,415,782 to Irwin et al. Increased flex life is especially important in particular end-uses, e.g., tire cord.

Reinforced Structures

Reinforced plastic composites or laminates, referred to above, comprised of a matrix polymer with a reinforcing amount of a fiber of this invention, are especially useful. The amount of fiber which is necessary to provide reinforcement is determined in a conventional manner, e.g., the amount will vary with the positioning thereof in the composite and the type and degree of reinforcement desired. Use of less than about 75 percent by weight of fiber is preferred; use of about 3 to 90 percent by volume of fiber is also preferred. A wide variety of conventional thermosetting and thermoplastic polymer matrices can be used, e.g., see "Handbook of Reinforced Plastics" of The Society of the Plastics Industry, Inc., S. S. Oleesky and J. G. Mohr, Reinhold, 1964. The preferred thermosetting matrices herein include phenolic (e.g., phenol-formaldehyde) polyester, epoxy (including conventional epoxy, epoxy novolak and epoxidized polyolefin) and polyamide-imide. The preferred thermoplastic matrices herein include polycarbonate, polyalkylene (e.g., polyethylene and polypropylene), polyamides and fluorocarbon (e.g., polytetrafluoroethylene). Among the other suitable thermosetting matrices may be named alkyd, melamine, ureaformaldehyde, silicone, phenyl-silane, polyimide, and thermosetting acrylics; among the other suitable thermoplastic matrices may be named vinyls, and polystyrene [including acrylonitrile-butadiene-styrene, (known as "ABS")]. Other suitable matrix polymers, such as natural or synthetic rubber, which are either thermoplastic or thermosetting (e.g., depending on the extent of vulcanization) can be suitably reinforced with fiber of this invention for, e.g., tires. Representative composites of the present invention are illustrated in Examples 8 and 9.

MEASUREMENTS AND TESTS

Orientation Angle

The orientation angle of the fiber (filament) is determined by the general method described in Krimm and Tobolsky, *Textile Research Journal*, Vol. 21, pp. 805-22 (1951). A wide angle X-ray diffraction pattern (transmission pattern) of the fiber is made using a Warhus pinhole camera. The camera consists of a collimator tube 3 in. (7.6 cm.) long with two lead (Pb) pin-holes 25 mils (0.0635 cm.) in diameter at each end, with a sample-to-film distance of 5 cm.; a vacuum is created in the camera during the exposure. The radiation is generated by Philips X-ray unit (Catalog No. 12045) wtih a copper fine-focus diffraction tube (Catalog No. 32172) and a nickel beta-filter; the unit is operated at 50 kv. and 16 ma. A fiber-sample holder 20 mils (0.051 cm.) thick is filled with the sample; all the filaments that are in the X-ray beam are kept parallel. The diffraction pattern is recorded on Kodak No-Screen medical X-ray film (NS-54T) or equivalent. The film is exposed for a sufficient time to obtain a pattern which is considered acceptable by conventional standards (e.g., a pattern in which the diffraction spot is be measured has a sufficient photographic density, e.g., between 0.2 and 1.0, to be accurately readable). Generally, an exposure time of about 45 minutes is suitable; however, a lesser exposure time may be suitable, and even desirable, for highly crystalline and oriented samples to obtain a more accurately readable pattern. The exposed film is processed at a temperature of 68° ± 2° F. in Du Pont Cronex X-ray developer for 3 min., in a stop bath (30 ml. of glacial acetic acid in 1 gal. [3.785 l.] of distilled water) for 15 sec., and in General Electric Supermix X-ray fixer and hardener solution for 10 min. The film is washed in running water for 0.5 hr. and is dried.

The arc length in degrees at the half-maximum intensity (angle subtending points of 50 percent of maximum intensity) of the principal equatorial spot is measured and taken as the orientation angle of the sample. The specific arcs used for orientation angle determinations on fibers described in the following examples occurred at the following positions, $2\theta$ (degrees):

| | |
|---|---|
| poly(p-phenylene terephthalamide) | 22.5° |
| poly(2-chloro-p-phenylene terephthalamide) | 18.5° |
| copoly(p-phenylene terephthalamide/2,6-dichloro-p-phenylene terephthalamide) | 16.5° |

The orientation angles of fibers of this invention are variously determined by three related densitometer methods (or equivalents thereof) from the X-ray film whose development has been described above.

In one method (Method One) an improved version of the "flying-spot" densitometer described by Owens and Statton in "Acta Cryst." (1957) 10, 560-562 is sued. The equipment is similar to that described by Owens and Statton in their FIG. 1, with the following differences:

1. The Sola Constant Voltage Transformer No. 80808 is replaced by Catalog No. 23-22-112, and this unit is connected only in series between the master switch of the 500-Volt Regulated Supply.
2. The Dumont No. 304 A Display Oscilloscope and the adjacent Calibrating Signal Generator are replaced by a Tektronix 532 Display Oscilloscope combined with a Tektronix Type 53/54 K Preamplifier. The combined units are connected in series only between the Main Switch and the Photomultiplier.
3. The Flying-Spot Oscilloscope (Dumont No. 304 A) and its Cathode-Ray Tube are replaced by a Tektronix 536 Oscilloscope having a 536 P 5 Cathode-Ray Tube.
4. The 500-Volt Regulated Supply is connected to the Photomultiplier and also to the Circle Generator (a type of device designated by Owens and Statton as a Scanning Frequency Generator).
5. The Circle Generator is connected at one point through a Tektronix Type 53/54 K Horizontal Preamplifier and at a second point through a line-circle switch and a Tektronix Type 53/54 K Vertical Preamplifier to the Tektronix 536 Oscilloscope.

Operation of this device follows the instructions given by Owens and Statton, except that the calibration with a square wave from a signal generator is not necessary. As described in the article, a metal block conveniently establishes the infinite density level of the display diagram. A clear portion of the film provides a reference for zero density.

As noted by the authors, the "flying-spot" densitometer provides a rapid measure of the orientation angle and the photographic density (optical density).

A second method (Method Two) by which orientation angles of the fibers of this invention are determined comprises a Leeds & Northrup Microphotometer (Catalogue No. 6700-P1) whose electronic components have been replaced by a Keithly 410 Micro-Microammeter (Keithley Instruments Inc., Cleveland, Ohio). The output of this apparatus is fed to a Leeds & Northrup Speedomax Recorder, Type G. From the curve traced by this apparatus on, e.g., semi-log chart paper, the orientation angle and the crystalline alignment may be obtained by procedures comparable to those employed with the Joyce-Loebl equipment described below.

In a third method (Method Three), to determine angles of the fibers of this invention, the azimuthal intensity distribution of the diffraction arc is obtained by use of a Joyce-Loebl Automatic Recording Microdensitometer (Model MK III C, having a rotating stage, product of Joyce-Loebl and Co., Gateshead, England). Typical instrument settings used are: lever ratio: 1:1; objective lens: 5/0.10; recorder speed: integrate; slit setting: 187; wedge: 0.087 density units/cm. Variations of these settings. which may be required by the nature of a given diffraction pattern, are made in accordance with the manufacturer's manual for this equipment (dated August, 1963). In operation, the film is placed on the stage, the instrument is focused on the film, and the center of the diffraction pattern is made coincident with the stage center; both these centers are made coincident with the light beam of the instrument. The stage and mounted film are moved to permit the light beam to pass through the most intense area of the diffraction spot, the opposite spot is checked to insure true centering, and after any necessary fine adjustments are made, the recording of the azimuthal intensity trace through a 360° rotation of the film is made on suitable linear scale coordinate paper. There is obtained a curve which has two major peaks. A base line is drawn beneath each peak such that the background density of the film is extended beneath the peak. A perpendicular line is dropped from each peak maximum to the base line. Through the mid-point of each perpendicular line (i.e., the "half-height" point) is drawn a line parallel to the base line which intersects each leg of the respective curves. The leg-to-leg length of each "half-height" horizontal line is converted to the degrees of arc as follows. The horizontal distance (i.e., parallel to the base line) between the two peak maxima is measured and represents 180° or arc. By direct proportion of this peak-to-peak distance, the "half-height" leg-to-leg distance is converted to a degree value. The values for the two arcs are averaged and this is the orientation angle referred to herein.

The percentage of crystallites with respect to the fiber axis within one-half of the angle calculated by the above-described method is determined as follows. For each peak of the above-described trace, perpendicular lines are dropped to the base line from the points of contact on the peak of the leg-to-leg "half-height" horizontal line. This establishes a rectangle bounded by the base line, the two perpendicular lines, and the "half-height " horizontal line. By use of a planimeter, the relative area of the rectangle plus the area of the peak under the curve and above the "half-height" horizontal line is determined (total = Area 1). The total area under the peak above the base line is then determined by the planimeter (Area 2). The percent of crystallites aligned within the orientation angle equals:

$$\frac{\text{Area 1}}{\text{Area 2}} \times 100.$$

Of the above three methods or instrument systems, Method Two and Three described above provide the most accurate determinations of the orientation angle. The precision of the "flying-spot" method (Method One) is about ±1.5° of angle value reported. The orientation angles reported in the following examples are determined using Method One (the "flying-spot" apparatus), unless otherwise indicated, since it provided speed and convenience of measurement for the large number of fibers analyzed.

Inherent Viscosity

Inherent viscosity ($\eta$inh) is defined by the following equation:

$$\eta\text{inh} = \frac{\ln(\eta\text{rel})}{C}$$

wherein ($\eta$rel) represents the relative viscosity and (C) represents a concentration of 0.5 gram of the polymer in 100 ml. of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by (C), above; flow times are determined at 30° C., using concentrated (95–98 percent) sulfuric acid as a solvent.

Fiber Tensile Properties

Fiber properties of tenacity, elongation, and initial modulus are coded as T/E/Mi and are reported in their conventional units, i.e., grams per denier, percent, and grams per denier. Denier is coded as Den. Such properties are conveniently measured in accordance with ASTM operational specifications, D76–53, (Oct. 1962), utilizing a testing machine, e.g., an Instron tester (product of the Instron Engineering Corp. Canton, Mass.), providing a constant rate of extension. Unless otherwise specified, samples having a break elongation of up to about 8% are tested at a rate of extension of 10%/minute; samples of higher break elongation are tested at 60%/minute. Samples are filaments which measure 1 inch (2.54 cm.) in length or yarns having 3 turns/inch which measure 10 inches (25.4 cm.) in length; and testing is done at 21° C. and 65% R.H.

Samples are boiled off (scoured) and the treatment consists of boiling the filaments or yarns for 30 minutes in 0.1 percent aqueous sodium lauryl sulfate, rinsing, drying at 40° C. for 1 hr. and conditioning at 21° C. and 65% R.H. for at least 16 hours, unless otherwise specified.

Laminate Tensile Properties

ASTM test method D790–66 (Procedure A) is used for testing flexural properties of the laminate (composite) herein, with the modification that a 4.0 inch span is used with samples 0.10 to 0.15 inch thick by 0.5 inch wide. The loading nose (0.125 inch radius) is operated at a crosshead rate of 0.05 inch/minute.

Flexural strength or ultimate flex strength (psi.) is equal to the maximum stress in the outer layer of fibers at the moment of break and is calculated by equation (3) of ASTM D790–66.

Flexural modulus (psi.) as used herein is obtained by drawing a tangent to the steepest initial straight-line portion of the load deformation curve and applying equation 5 of ASTM D790–66.

Sonic Velocity

In the following examples, the velocity of sound in fibers of this invention, identified as the sonic velocity (SV) of the fiber, is determined by using (in a conventional manner, according to the manufacturer's directions) a KLH dynamic modulus tester PPM–5 (product of the KLH Research and Development Corp., Cambridge, Mass.), hereinafter identified as "PPM-5," in conjunction with a Speedomax Type G potentiometric recorder (product of the Leeds & Northrup Co., Philadelphia, Pa.), hereinafter identified as "recorder." The latter instrument is operated as a 10-millivolt recorder. These instruments permit measurements to be made as plots of sound propagation time as a function of distance.

The procedure by which the sonic velocity measurements herein are determined may be summarized as follows, with all measurements being taken in an air atmosphere maintained at 70° F. and 65 percent relative humidity, (R.H.). The yarns are exposed to the latter conditions for a minimum of 16 hours prior to the SV determination.

The range switch of the modular unit of the PPM–5 is set at 100, thus causing the recorder to read 100 microseconds on a full scale deflection basis, or 10 microseconds for each inch across the paper perpendicular to the paper direction. The recorder is adjusted to advance the chart paper (No. 690489, Leeds & Northrup Co.) at the rate of 0.688 inch/min.

The yarn sample is mounted in the scanner unit of the PPM–5 and is properly weighted to effect a tension on the yarn of 0.1 g./den. The power switch, zero control, and threshold adjustment are activated (in a conventional manner, according to the manufacturer's directions). Then, while the movable transducer (or yarn probe) of the PPM–5 scanner cyclicly moves away from and toward the stationary transducer (yarn probe) at the rate of 3 in./min. a sonic pulse signal of 10,000 cycles/sec. is applied to the yarn. As the probe moves along the yarn, on the chart paper is recorded a diagonal line which traverses the paper from side-to-side. The stylus of the recorder reverses direction when the probes are at the points of maximum and minimum separation from each other.

Since the chart paper is advanced at the rate of 0.688 in./min., the probe speed along the yarn is faster than the chart advancement speed by a ratio of 3/0.688 or 4.36/1 [i.e., for each one inch of chart movement, the moving probe has covered 4.36 inches (11.05 cm.) along the yarn.]

The velocity of sound between two points in the yarn (sonic velocity, SV) is then determined by multiplying the slope of the recorded chart line by 11.05 km./sec. as follows:

$$SV = \frac{\text{vertical distance in inches between 2 points on chart line}}{\text{horizontal distance in inches between 2 points on chart line}} \times 11.05 \frac{\text{km.}}{\text{sec.}}$$

The factor, 11.05 km./sec., results from the combination of chart and probe speeds and the unit conversion requirements as shown in the calculation below.

$$\frac{4.36 \text{ inch}/1 \text{ inch vertical (chart)}}{10 \text{ microseconds}/1 \text{ inch horizontal (chart)}}$$

$$\times \frac{2.54 \frac{\text{cm.}}{\text{inch}} \times 10^{-5} \frac{\text{km.}}{\text{cm.}}}{10^{-6} \frac{\text{sec.}}{\text{microsecond}}} = 11.05 \frac{\text{km.}}{\text{sec.}}$$

Sonic velocity values reported herein are based on a measurement of the slope of the chart line established as the two probes separate (i.e., as the moving probe travels away from the yarn tension weight). Usually, the slope value which is multiplied by 11.05 km./sec. is the average of three separate slope determinations made for three separate diagonal chart lines.

EXAMPLES

The following nonlimiting examples are illustrative of the practice of the invention. Parts and percentages are by weight unless otherwise indicated.

EXAMPLE 1

This example illustrates a synthesis of poly(p-phenylene terephthalamide), using benzoyl chloride as a chain terminator.

p-Phenylenediamine (16.2 g., 0.15 mole), benzoyl chloride (0.63 g., 0.0045 mole), hexamethylphosphoramide (180 ml.), and N-methylpyrrolidone-2(90 ml.) are combined in a suitable vessel and stirred for 15 min. while being cooled in a bath of ice and water. To the resulting cooled solution is added terephthaloyl chloride (30 g., 0.148 mole), thereby causing an immediate thickening of the vessel's contents. A clear, jelly-like mixture results within 3 minutes. After water is added to stop the polymerization, the reaction mixture is agitated with more water in a blender to precipitate the polymer. After the isolated product is dried overnight at 85°0 C. in a vacuum oven, there is obtained light-yellow, fibrous poly(p-phenylene terephthalamide), 35.7 g., $\eta$inh=2.25.

The product of a similar synthesis which employed p-aminobenzoic acid as a terminator exhibits an inherent viscosity of 2.23.

EXAMPLE 2

This example illustrates the preparation of a tough, flexible film and of fibers from a polyamide described in Example 1.

Film Preparation

A dope containing 2.8 percent by weight polymer and 1.8 percent by weight salt is prepared by combining 8 g. of the polyamide of Example 1 ($\eta$inh=2.25), 5 g. of lithium chloride, and 260 ml. of a hexamethylphosphoramide/N-methylpyrrolidone-2mixture (2/1, V/V). Using a 0.005 inch (0.127 mm.) doctor blade, this dope is cast into a film which is coagulated in water, then washed with water and dried at 85° C. in a vacuum oven. There is obtained a tough, self-supporting, very flexible, light-yellow, nearly transparent film. Similar films are obtained under different washing and drying conditions.

Fiber Preparation

A spinning dope containing 5.3 percent by weight polymer and 3.3 percent by weight salt is prepared by first combining 16 g. of the polyamide prepared in Example 1 ($\eta$inh=2.25), 10 g. of lithium chloride, 180 ml. of hexamethylphosphoramide, and 90 ml. of N-methylpyrrolidone-2, using ice bath cooling. These ingredients are stirred for about 12 hours, using an ice bath, as necessary, to maintain the temperature of the dope at about 0–15° C. The dope is stored 24 hours at 25° C. in a drybox. The dope is then extruded through a five-hole spinneret, each hole of 0.0004 inch (0.01 cm.) diameter, into a coagulating bath of water maintained at 25° C. The resulting fibers are wound up at the rate of 105 ft./min. (32 m./min.). The fibers, after being soaked on the bobbin in water and dried, exhibit the following properties: T/E/Mi/Den.: 3.9/9/181/3.4; orientation angle is about 40° (Method Two).

EXAMPLE 3

This example illustrates the preparation of high molecular weight poly(p-phenylene terephthalamide) and the preparation of fibers thereof having enhanced tensile properties.

To a solution of p-phenylenediamine (21.6 g., 0.2 mole) in 320 ml. of hexamethylphosphoramide is added terephthaloyl chloride (40.6 g., 0.2 mole), using water bath cooling. The reaction mixture is permitted to stand overnight and the precipitated polymer is collected and divided into six portions which are washed thrice with water and once with acetone in a blender operating at high speed. After the product is dried in a vacuum oven for 5 days at 60° C., there is obtained a quantitative yield of poly(p-phenylene terephthalamide) ($\eta$inh=2.59).

A spinning dope containing 6.2 percent by weight polymer and 4.0 percent by weight salt is prepared by first combining 15 g. of the above-prepared polyamide, 9.7 g. of lithium chloride, 140 ml. of hexamethylphosphoramide, and 70 ml. of N-methylpyrrolidone-2, using ice bath cooling. These ingredients are then stirred for about 12 hrs. at about 25° C. (ice bath cooling when necessary). The dope is extruded through a 20-hole spinneret, each hole of 0.003 inch (0.08 mm.) diameter, into a water bath maintained at 25° C. After the resulting fibers are wound up, washed on the bobbin in water and dried, they exhibit the following properties: T/E/Mi/Den.: 3.8/18/123/2.9; orientation angle is 50°. These fibers are soaked on the bobbin in hot formic acid, resoaked in water and then dried before drawing. After these fibers are drawn 1.1X in a heated slot, 14 inches (0.36 m.) in length, (temperature at center of slot is 400° C.; residence time in slot is 2.4 seconds) in a nitrogen atmosphere, they exhibit the following properties: T/E/Mi/Den.: 4.7/2.4/228/3; orientation angle is 27°. After the drawn fibers are passed through a heated slot 14 inches (0.36 m.) in length (temperature at center of slot is 500° C.; residence time in slot is 2.4 seconds) in a nitrogen atmosphere, they display the following properties: T/E/Mi/Den.: 7.8/1.7/467/2.7; orientation angle is 19°. After receiving a third heat treatment (slot and residence time the same; center-slot temperature is 530° C.) the fibers exhibit the following properties: T/EMi: 6.9/1.3/564; orientation angle is 16°.

EXAMPLE 4

This example illustrates the preparation of poly(p-phenylene terephthalamide) fibers from a spin dope obtained by in situ polymerization.

To a mixture of 60 ml. of hexamethylphosphoramide and 30 ml. of N-methylpyrrolidone-2 are added 5.4 g. (0.05 mole) of p-phenylenediamine and 0.28 g. (0.002 mole) of benzoyl chloride. These ingredients are stirred for 15 min. before 10 g. (0.05 mole) of terephthaloyl chloride are added, using water bath cooling to maintain the temperature of the reaction below about 40° C. After the reaction mixture is stirred for 0.5 hr., the resulting warm (30–40° C.) spin dope is extruded through a single hole spinneret into a coagulating bath of warm water. After the emerging fiber is wound up, washed on the bobbin in water and dried, it exhibits the following properties: T/E/Mi/Den.: 1.1/0.7/137/7.6; orientation angle is 36°.

A sample of the polymer, isolated from the spin dope, exhibits an inherent viscosity of 1.35.

EXAMPLE 5

This example illustrates the preparation of fibers of poly(p-phenylene terephthalamide) from a concentrated (95–98 percent) sulfuric acid spin dope.

p-Phenylenediamine (21.6 g., 0.02 mole) is dissolved in 320 ml. of hexamethylphosphoramide and the resulting solution is cooled for 10 minutes in a bath of ice and water. Powdered terephthaloyl chloride (40.6 g., 0.2 mole) is added with vigorous stirring while cooling is continued. Polymer precipitates in about 15 seconds. The reaction mixture is mechanically stirred for about 1 minute, after which it is mixed with a spatula to give a wet powder. The mixture is allowed to stand at room temperature for a few hours before 500 ml. of N,N,N',N'-tetramethylurea are added to produce a thick paste. After a portion of this paste is removed, the remainder is divided into four separate batches. Each batch is agitated with water (3 × 350 ml.) in a blender. The polymer obtained from the combined batches is dried in a vacuum oven at about 90° C. for 2 days to produce poly(p-phenylene terephthalmide) as a fibrous, yellow powder, 40.5 g., $\eta$inh=2.36.

The above-described polyamide (7.0 g.) is dissolved in 50 ml. of concentrated (95–98 percent) sulfuric acid to form a spin dope containing 7.2 percent polymer. The dope is extruded through a single-hole spinneret (0.004 in., 0.1 cm., in diameter) into a water bath maintained at 40–45° C. The resultant fiber is wound up on a bobbin which is soaked in cold water for 1 hr., then in a mixture of N,N-dimethylacetamide/water (50/50, V/V) for 1hr., and again in water for 1 hr. It is washed with acetone and dried at room temperature. The dried fiber exhibits the following properties: T/E/Mi: 2.6/4.8/146; orientation angle is 50°. After this fiber is drawn 1.1X in a heated slot, 14 inches (0.36 m.) in length, (temperature at center of slot is 400° C., residence time in slot is 2.4 seconds) in nitrogen atmosphere, it exhibits the following properties: T/E/Mi: 1.7/1.0/233; orientation angle is 27°.

EXAMPLE 6

This example illustrates the preparation of poly(p-phenylene terephthalamide) fibers from a concentrated (95–98 percent) sulfuric acid spin dope and the improvement of fiber properties by a subsequent heat treatment.

To a solution of p-phenylenediamine (21.6 g. 0.2 mole) dissolved in a mixture of hexamethylphosphoramide (240 ml.) and N-methylpyrrolidone-2 (120 ml.) is added terephthaloyl chloride (40.6 g., 0.2 mole), using a cooling bath of ice and water. Polymer comes out of solution within seconds. The reaction mixture is permitted to stand for 1 hr. after which the polymer is isolated and agitated with water in a blender. After the product is dried at 85° C. for 3 days in a vacuum oven, there is obtained a quantitative yield of light-yellow, fibrous poly(p-phenylene terephthalamide), $\eta inh=3.6$.

The above-described polyamide is dissolved in concentrated (95–98 percent) sulfuric acid to form about a 5 percent (W/V) spin dope. This dope is extruded at a pressure of 250 lb./in.$^2$ (17.2 kg./cm.$^2$) through a 100-hole spinneret, each hole of 0.003 inch (0.08 mm.) diameter, into a water bath maintained between 15–18° C. The yarn bundle passes around a series of rollers in the bath and is wound up on bobbins. The bobbins are soaked (1) in water for a few hours, (2) in dilute sodium carbonate solution overnight, and (3) in running water for a few hours before being dried in air at room temperature. The fibers after being boiled off and dried, exhibit the following properties: T/E/Mi/Den.: 3/14.2/107/1.3. After the yarn is drawn 1.14X under a nitrogen atmosphere in a heated slot 14 inches (0.36 m.) in length (temperature at center of slot is 530° C.; residence time in slot is 2.4 seconds), the yarn exhibits the following properties: T/E/Mi/Den.: 3.1/1.0/383/6 9.4; orientation angle is 23°.

EXAMPLE 7

This example illustrates the preparation of high modulus fibers of poly(2-chloro-p-phenylene terephthalamide).

A. 2-Chloro-p-phenylenediamine (35 g., 0.245 mole) is dissolved in 425 ml. of hexamethylphosphoramide and the resulting solution is cooled for 10 minutes with a bath of ice and water, with stirring. To this is added, all at once with cooling and vigorous stirring, powdered terephthaloyl chloride (49.7 g., 0.245 mole). Precipitation of polymer begins in about 15 seconds. In another 15 seconds the reaction mixture becomes so stiff that stirring becomes difficult. Cooling and what little stirring can be effected are continued for 45 minutes. After the reaction is allowed to stand overnight, 400 ml. of N,N-dimethylacetamide are added. The polymer is washed in four batches in a blender, each batch being washed twice with water and once with acetone. The combined, washed polymer samples are dried in a vacuum oven for 12 hrs. at 50° C., then stored for 2 days in a dry box at room temperature. There is obtained poly(2-chloro-p-phenylene terephthalamide), 81.6 g., $\eta inh=1.8$.

A spinning dope is prepared by dissolving the above-described polyamide (2.5 g.) in 25 ml. of a mixture of 100 ml. of N,N-dimethylacetamide and 6.2 g. of lithium chloride The fiscous dope, containing 9.2 percent by weight polymer and 5.6 percent by weight salt, is extruded through a 20-hole spinneret, each hole of 0.003 inch (0.08 mm.) diameter, into a water bath maintained at 25° C. The emerging fibers are wound up at the rate of 51 ft./min (15.5 m./min.). After the fibers are soaked in cold water for about 4 hrs. and dried in air at room temperature, they exhibit the following properties: T/E/Mi/Den: 4.3/15.6/152/2.3; orientation angle is 60°. After these fibers are drawn 1.02X while passing through a nitrogen-filled tube whose center is maintained at 350° C., (residence time in tube is 3.0 seconds) they exhibit the following properties: T/E/Mi: 5.2/1.9/346; orientation angle is 23°.

B. To a stirred solution of 2-chloro-p-phenylenediamine (35 g., 0.245 mole) dissolved in 425 ml. of hexamethylphosphoramide, cooled in a bath of ice and water, is added terephthaloyl chloride (49.7 g., 0.245 mole). Almost immediately a precipitate forms as a wet paste. The reaction is permitted to stand overnight, after which the polymer is collected and agitated with water in a blender. The polymer is dried for several days at 78° C. in a vacuum oven. There is obtained poly(2-chloro-p-phenylene terephthalamide) 60 g., $\eta inh=1.13$.

A spinning dope containing 9.2% by weight polymer and 5.6 percent by weight salt is prepared by combining 5 g. of the above-described polyamide with 50 ml. of a mixture comprising 50 ml. of N,N-dimethylacetamide and 3.1 g. of lithium chloride. This viscous dope is extruded through a three-hole spinneret, each hole 0.003 inch (0.08 mm.) in diameter, into a water bath maintained at 25° C. The emerging fibers are wound up at the rate of 32–60 ft./min. (9.7–18.3 m./min.). After the fibers are washed in cold water for about 4 hrs. and dried in air, they exhibit the following properties: T/E/Mi/Den.: 2.5/13/107/5.3; orientation angle is 65°. After these fibers are passed by hand over a hot pin maintained at 42° C., (residence time is about 1–2 seconds) they exhibit the following properties: T/E/Mi: 4.15/0.9/535; orientation angle is 19°.

C. To a stirred solution of 2-chloro-p-phenylenediamine (5.62 g., 0.04 mole) dissolved in 72 ml. of dry N,N-dimethylacetamide, cooled in a bath of ice and water, is added terephthaloyl chloride (8.02 g., 0.04 mole). Almost immediately a precipitate forms as an unstirrable paste. After 30 minutes, calcium oxide (3.2 g., 0.057 mole) is added whereupon the paste becomes mobile. After the reaction vessel contents are stirred for 1 hr., they are agitated with water in a blender. After the solid product is collected, washed, and dried, there is obtained poly(2-chloro-p-phenylene terephthalamide), 10.5 g. (98 percent yield), $\eta inh=1.71$.

A viscous spinning dope containing 8 percent by weight polymer is prepared by combining 4 g. of the above-described polyamide with 25 ml. of concentrated (95–98 percent) sulfuric acid. This dope is extruded at room temperature through a 20-hole spinneret, each hole of 0.003 inch (0.08 mm.) diameter, into a water bath maintained at 26° C. The emerging fibers are wound up at 42 ft./min. (12.7 m./min.). After the fibers are washed in cool, running water for 4 hrs. and dried in air at room temperature, they exhibit the following properties: T/E/Mi/Den.: 2.26/21/101/5.2. After these fibers are drawn 1.38X over a 0.75 inch bar maintained at 300° C. (residence time is about 1–4 seconds), they exhibit the following properties: T/E/Mi/Den.: 4.5/1.2/438/4.6; orientation angle is 17°.

EXAMPLE 8

This example illustrates the preparation of a high viscosity sample of poly(p-phenylene terephthalamide) in a mixed solvent system and the spinning of strong fibers directly therefrom. A strong laminate is prepared from these fibers.

p-Phenylenediamine (669.2 g., 6.2 mole), hexamethylphosphoramide (7.4 l.), and N,N-dimethylacetamide (15.5 l.) are mixed together for 0.5 hr. under nitrogen. The stirred solution is then cooled (e.g., to about 12° C.) in an ice/methanol bath until the diamine begins to crystallize. The rate of stirring is then increased and terephthaloyl chloride (1,256.8 g., 6.2 mole) is added to the reaction vessel. The reaction mixture becomes a thick gel in about 2.5–3 minutes. Stirring is continued and lithium carbonate (460 g., 6.22 mole) is added 10 minutes after the addition of the acid chloride. The cooling bath is removed and the neutralized reaction mixture is stirred for 1 hr. to form a fluid anisotropic (stir opalescent) dope. (A sample of the dope is removed and combined with water to precipitate the polymer which is isolated, washed, and dried; $\eta inch = 3.64$).

The dope is extruded at room temperature through a 580-hole spinneret (hole diameter is 0.003 inch, 0.008 mm.) into a coagulating bath comprised of N,N-dimethylacetamide/water (50/50, vol./vol.) which contains 2 percent by weight of lithium chloride and which is at 50° C. The emerging filaments are wound up at 100 ft./min., washed, and dried. The resulting yarn exhibits the following tensile properties: Den./T/E/Mi: 936/10.4/3.8/00 (not boiled off); O.A. < 35°. After a sample of this yarn is heat treated and drawn by being passed through a 10 ft. long oven, whose central 8 ft. long portion is at b 580° C., at about 165 ft./min. under a tension of 1.54 g./den. while being drawn 1.029X, the following tensile properties are exhibited by the yarn: Den./T/E/Mi: 861/11.5/1.3/1,110 (not boiled off).

A resin is prepared by mixing 100 g. of Union Carbide Company's epoxy resin type ERLA 4617 with 23.3 g. of m-phenylene diamine. A continuous length of the above-described heat treated poly(p-phenylene terephthalamide) yarn is conducted, in order, through (1) a tensioning device which causes the fibers to separate due to static charges, (2) a bath of the resin described above, and (3) rubber wiping blades which remove some resin. The yarn, wet with resin, is wound around the length of a open-end Teflon-coated double mold, which has an I-beam cross-section (dimensions of the cavities of the mold are about 5.75 × 0.5 × 0.5 in., length × width × depth), by rotating the mold on an axis transverse to its length. A traversing device is employed to place the yarn bundle essentially parallel to the long axis of the mold. Male parts of the mold are then fitted into the two cavities of the mold and are fastened by screws to the desired pressure, thus causing excess resin to be extruded. The yarn exposed at each end of the mold is then cut. The mold and its contents are heated for 5 hr. at 105° C., then for 16 hr. at 120° C., and finally for 16 hr. at 160° C. The mold is allowed to cool and the two yarn-epoxy laminates are removed. The demolded laminate sample contains about 65 percent by volume of the yarn and has a density of 1.4 g./cm.$^3$. The flexural modulus of the laminate is 13.6 × $10^6$ psi and the flexural strength is 100.2 × $10^3$ psi. In contrast, laminates of "E" glass (having a density of 2.09 g./cm.$^3$) have a theoretical flexural modulus of 6.5 × $10^6$ psi at the same volume percent fiber.

EXAMPLE 9

This example illustrates the preparation of a high viscosity sample of poly(2-chloro-p-phenylene terephthalamide) and the spinning of high strength fibers thereof directly from the anisotropic polymerization dope. A strong laminate is prepared from these fibers.

A solution of 2-chloro-p-phenylenediamine (570.4 g., 4.0 mole) in N,N-dimethylacetamide (161.) is stirred for 0.5 hr. at $-10°$ C. Finely divided terephthaloyl chloride (772 g., 3.8 mole) is then added over a period of 5 minutes. Stirring is maintained for 20 min. at $-10°$ C., after which lithium carbonate (295.6 g., 4.0 mole) is added. After further stirring for 20 min. at $-10°$ C., an additional 28 g. (0.138 mole) of terephthaloyl chloride are added. Stirring at 15° C. is performed overnight to form a fluid dope (a sample of polymer, obtained as in the previous example, exhibits $\eta$inh = 3.73). This anisotropic (stir opalescent) dope is extruded through a 580-hole spinneret (hole diameter is 0.003 inch) into an aqueous coagulating bath maintained at 12°–13° C. The emerging yarn is wound up at 100 ft./min., washed, and dried on a roll. The yarn exhibits the following properties: Den./T/E/Mi: 725/11.5/5/411 (not boiled off); O.A. = 31°. After a sample of this yarn is heat treated and drawn by being passed through an induction furnace (40 inches long), whose center portion is at 445° C., at 50 ft./min. while being drawn 1.08X, the following properties are exhibited by the yarn: Den./T/E/Mi: 674/14.4/1.4/,024 (not boiled off).

A resin is prepared as in the previous example. Heat treated poly(2-chloro-p-phenylene terephthalamide) yarn, as prepared above, is formed into a cured laminate according to the procedure of the previous example. The demolded laminate contains about 58.8 percent by volume of the yarn and has a density of 1.375 g./cm.$^3$. The flexural modulus of the laminate is 12.23 × $10^6$ psi and the flexural strength is 93.2 × $10^3$ psi. In contrast, laminates of "E" glass (having a density of 2.01 g./cm.$^3$) have a theoretical flexural modulus of 5.88 × $10^6$ psi at the same volume percent of fiber.

EXAMPLE 10

This example illustrates the preparation of high modulus fibers of copoly(p-phenylene terephthalamide/2,6-dichloro-p-phenylene terephthalamide).

To a solution of p-phenylenediamine (6.48 g., 0.06 mole) and 2,6-dichloro-p-phenylenediamine (7.08 g., 0.04 mole) in 170 ml. of hexamethylphosphoramide, cooled in a bath of ice and water, is added terephthaloyl chloride (20.3 g., 0.1 mole). A precipitate forms in about 10 minutes. After the reaction mixture is permitted to stand over the weekend, it is agitated with water in blender. The polymer is isolated by filtration, washed, and dried at 90° C. in a vacuum oven for 3 days. There is obtained a quantitative yield of poly(p-phenylene terephthalamide/2,6-dichloro-p-phenylene terephthalamide) (60/40), $\eta$inh=1.62; this corresponds to a non-conforming comonomer unit content of about 20 mol percent.

A spin dope containing 10.5 percent by weight copolymer and 3.9 percent by weight salt is prepared by combining 16 g. of the above-described copolyamide, 7.4 g. of lithium chloride, 110 ml. of N,N-dimethylacetamide, and 40 ml. of tetramethylene sulfoxide and subjecting the ingredients to shear-disc stirring. The dope is extruded through a five-hole heated (95°–102° C.) spinneret, each hole of 0.005 inch (0.0127 cm.) diameter, into a drying column maintained at between 198°–210° C. and which is swept with a co-current stream of dry nitrogen (5 ft.$^3$/min., 0142 m.$^3$/min.) which enters the column at about 225° C. the emerging fibers are washed with water and are wound up at about 120 yd./min. (110 m./min.). The entire fiber package is soaked overnight in water. After being kept in a polyethylene bag for a few days a portion of the fiber is extracted overnight with an aqueous solution of Duponol ME (Du Pont's registered trademark for a surface active agent comprising technical grade sodium lauryl sulfate). After the extracted fiber is boiled off and dried, it exhibits the following properties: T/E/Mi/Den.: 2.42/26/71/6.9. The fiber is drawn 1.3–1.5X over a 0.75 inch bar maintained at 200°–210° C. (residence time is about 1–4 seconds); the following properties are observed: T/E/Mi/Den.: 3.71/5.5/157/4.6. After the drawn fiber is passed over a hot plate at 400° C. (residence time is about 1–4 seconds), the following properties are observed: T/E/Mi/Den.: 4.25/2.2/215/4.2; orientation angle is 26°.

EXAMPLE 11

This example illustrates the preparation of high modulus poly(2-chloro-p-phenylene terephthalamide) fibers from an optically anisotropic spin dope comprising about 20 percent by weight of the polyamide.

A dope containing 17.2 percent by weight polymer and 2.7 percent by weight salt is prepared by combining 5 g. of poly(2-chloro-p-phenylene terephthalamide) ($\eta$inh=1.13, polymer of Example 7–B) with 25 ml. of a solution obtained by mixing 100 ml. of N,N-dimethylacetamide and 3.1 g. of lithium chloride. The dope is allowed to stand at room temperature for a week of longer, during which time it separates into an isotropic upper layer and an anisotropic lower layer (i.e., for the lower layer, T>70, as determined by the method described herein); volume ratio is about 2.6/1 (upper/lower). The layers are isolated and the anisotropic lower layer is extruded at room temperature through a five-hole spinneret, each hole 0.003 inch (0.08 mm.) in diameter, into a water bath maintained at 21° C. The fibers produced are wound up at 57 ft./min. (17.4 m./min.). After the fibers are soaked in water and dried, they exhibit the following properties: T/E/Mi: 3.5/1.8/234; orientation angle is 39.2° (Method Two). When this yarn is passed over a 425° C. pin, filament T/E/Mi become: 2.4/0.7/318; orientation angle is 28° (Method Two).

Physical properties and composition data for each of the above-described layers are tabulated below in Table I. Unless specified otherwise, determinations are made at 25°–26° C.

TABLE I

|  | Upper Layer | Lower Layer |
| --- | --- | --- |
| Density, g./ml. | 0.97 | 1.01 |
| Ref. Index, $n_D^{25}$ | 1.4725 | 1.4676 |
| Polymer content, g./ml. | 0.112 | 0.179 |
| Polymer $\eta$ inh | 0.43 | 1.44 |
| LiCl content, g./ml. | 0.0260 | 0.0238 |

EXAMPLE 12

This example illustrates the preparation of an optically anisotropic spin dope comprising about 10 percent by weight poly(2-chloro-p-phenylene terephthalamide) and the preparation of high modulus fibers therefrom.

A dope containing 9.5 percent by weight polymer and 1.5 percent by weight salt is prepared by combining 5 g. of poly(2-chloro-p-phenylene terephthalamide) ($\eta$inh=1.13, polymer of Example 7–B) with 50 ml. of a solution obtained by mixing 100 ml. of N,N-dimethylacetamide and 1.6 g. of lithium chloride. The dope is allowed to stand at room temperature for a week or longer, during which time it separates into two liquid layers or phases of approximately equal volume, the upper of which is isotropic an the lower anisotropic (i.e., for the lower layer, T>70, as determined by the method described herein). The layers are isolated and the anisotropic lower layer is extruded at room temperature through a one-hole spinneret, the hole being 0.005 inch (0.0127 cm.) in diameter, into a water bath maintained at 21° C. The resultant fiber is wound up at 72 ft./min. (22 m./min.). After the fiber is soaked in water and dried, it exhibits the following properties: T/E/Mi: 4.6/4.8/198; orientation angle is 43.9° (Method Two) When this yarn is passed over a 425° C. pin, filament T/E/Mi become: 3.1/1.3/274; orientation angle is 28° (Method Two).

Physical properties and composition data for each of the above-described layers are tabulated below in Table II. Unless specified otherwise, determinations are made at 25°–26° C.

TABLE II

|  | Upper Layer | Lower Layer |
| --- | --- | --- |
| Density, g./ml. | Not Taken | 0.99 |
| Ref. Index, $n_D^{25}$ | 1.4584 | 1.4544 |
| Polymer content, g./ml. | 0.080 | 0.098 |
| Polymer, $\eta$ inh | 0.74 | 1.61 |
| LiCl content, g./ml. | 0.0120 | 0.0146 |

In a manner similar to that described above, another spinning dope is prepared, i.e., 5 g. of the polymer in 50 ml. of the amide-salt mixture. The dope is permitted to stand for about a week after which it is shaken to combine the layers into a turbid dope which is not optically clear; T>50 as determined by the method described herein. This turbid dope is immediately extruded at room temperature through two holes of a spinneret, each holes 0.005 inch (0.0127 cm.) in diameter, into a water bath kept at 23° C. The fibers are wound up between 32–44 ft./min. (9.8–13.5 m./min.). After the fibers are soaked in water and dried, they exhibit the following properties: T/E/Mi: 4.1/2.7/223; orientation angle is 38.9° (Method Two).

EXAMPLE 13

This example illustrates the preparation of a birefringent spinning dope of poly(p-phenylene terehthalamide) comprising a mixture of anisotropic an isotropic phases.

A dope containing 7.96 percent by weight polymer and 1.24 percent by weight salt is prepared by first combining poly(p-phenylene terephthalamide) (18 g., $\eta$inh=1.32, prepared by a procedure similar to Example 4 with p-aminobenzoic acid being employed as terminator), hexamethylphosphoramide (160 m.), N-methylpyrrolidone-2(40 ml.), and lithium chloride (2.8 g.). The ingredients are mixed with a shear-disc stirrer and are cooled in a bath of ice and water. After the ingredients stand overnight, with cooling, there is produced a smooth, free-flowing, homogeneous paste. The latter is heated to 60° C. to produce a fluid dope (slightly turbid when allowed to stand unheated) which exhibits stir opalescence when stirred.

This dope, when heated to about 35° C. to become fluid, and free of gel phase, exhibits birefringence when viewed with a polarizing microscope, i.e., a bright field is observed with the microscope.

The apparatus by which filaments are prepared from this dope comprises a solution cell to which is connected an S-shaped tube containing a 20-hole spinneret in its lower end (each spinneret hole is 0.004 inch, 0.01 cm., in diameter). After the hot (60° C.) dope is poured into the solution cell, the cell and the S-shaped tube are warmed with a heat gun until the dope begins to flow from the spinneret orifices. The apparatus is then positioned such that the spinneret discharges in a horizontal direction into a water bath kept at 60° C. The S-shaped tube is partially immersed in the bath to assist in keeping the dope warm prior to extrusion. The dope is extruded at a pressure of 20 lb./in.² (0.14 kg./cm.²) and the resultant fibers are wound up on bobbins at 72 ft./min. (22 m./min.), care being taken to keep the fibers taut at the spinneret face. The bobbins are washed in cold water for several hours before being dried in air at room temperature. Fibers from one of the bobbins exhibit the following properties: T/E/Mi/Den.: 3.7/4.0/194/3.7; orientation angle is 37° (Method Two).

When the above-cited procedure is repeated, with the change that the spinneret holes are each 0.003 in. (0.08 mm.) in diameter, there are obtained poly(p-phenylene terephthalamide) fibers having the following properties: T/E/Mi/Den.: 3.2/3.2/219/2.54; orientation angle is 37.3° (Method Two).

EXAMPLE 14

This example illustrates the wet-spinning of an optically anisotropic dope to form poly(p-phenylene terephthalamide) fibers whose properties are significantly enhanced by a subsequent heat treatment.

Poly(p-phenylene terephthalamide) (18 g., $\eta$inh=1.32, prepared by a procedure similar to Example 4 with p-aminobenzoic acid being employed as terminator), hexamethylphosphoramide (134 ml.), N-methylpyrrolidone-2(66 ml.), and lithium chloride (2.8 g.) are combined and stirred at −10° C. for 2–3 hrs. to produce a thick mobile paste which is allowed to warm slowly to room temperature. A fluid dope is produced by continuously stirring the material for 3 days; the dope exhibits opalescence when stirred. The dope is birefringent, since T>46 as measured herein.

The dope, containing 7.95 percent by weight polymer and 1.24 percent by weight salt, is extruded at 20 lbs./in.²(0.14 kg./cm.²) through a 20-hole spinneret, each hole being 0.003 inch (0.08 mm.) in diameter, into a water bath kept at 26° C. The resultant fibers are wound up at 36 ft./min. (11 m./min.) on bobbins which are washed in cool water for 3 hrs. before being dried in air at room temperature. Yarn from one bobbin exhibits the following properties: T/E/Mi/Den.: 1.93/2.3/140/5.7; orientation angle is 42.5°. A sample of this yarn which has been passed at 20 ft./min. (6.1 m./min.) through a nitrogen-filled tube 1 ft. (0.3 m.) in length and which is heated a the center to 560° C. exhibits the following properties: T/E/Mi/Den.: 3.94/1/414/38.4; orientation angle is 24°.

EXAMPLE 15

In the following Table III are summarized various conditions employed to transform as-extruded fibers of the type shown herein into the fibers of this invention, i.e., those with an initial modulus (Mi) of at least 170 gpd. and an orientation angle of up to 40°. All polymer and fiber preparations are accomplished by procedures similar to, if not equivalent to, methods previously shown herein.

TABLE III

| Item | Polymer Type | Polymer $\eta_{inh}$ | As-extruded properties T | As-extruded properties E | As-extruded properties Mi | As-extruded properties Den. | As-extruded properties O.A. | Treatment | Residence time (seconds) | Properties after treatment T | Properties after treatment E | Properties after treatment Mi | Properties after treatment Den. | Properties after treatment O.A. |
|---|---|---|---|---|---|---|---|---|---|---|---|---|---|---|
| 1 | A | 2.25 | 3.7 | 20 | 122 | 4.1 | 50° | Drawn 1.06X over a bar maintained at 300° C. Passed through a heated slot, temperature at center of slot is 475° C. (N₂ atmosphere). | ~1-4 2.4 | 1.6 | 0.7 | 239 | 4.7 | 21° |
| 2 | A | 2.25 | 3.9 | 9 | 181 | 3.4 | 40° | Drawn 1.1X at 400° C | 2.4 | 4.6 | 5 | 231 | 4.5 | 27° |
| 3 | A | 2.25 | 3.6 | 20 | 112 | 6.2 | 45° | Passed through a heated slot, temperature at center of slot is 525° C. (N₂ atmosphere). | 2.4 | 5 | 1.5 | 309 | 5 | 20° |
| 4 | A | 2.56 | 3.8 | 18 | 123 | 2.9 | 50° | Drawn 1.06X in a heated slot, temperature at center of slot is 400° C. (N₂ atmosphere). | 2.4 | 5.3 | 5.4 | 200 | 2.6 | 31° |
| 5 | B | 1.13 | 1.8 | 3.1 | 87 | | 55° | Passed over 425° C. pin | ~1-2 | 5.3 | 2.3 | 281 | | 26° |
| 6 | B¹ | 1.44 | 3.5 | 1.8 | 234 | | ³39.2° | do | ~1-2 | 2.4 | 0.7 | 318 | | 28° |
| 7 | B² | 1.61 | 4.6 | 4.8 | 198 | | ³43.9° | do | ~1-2 | 3.1 | 1.3 | 274 | | 28° |

¹ As-extruded data from Example 11.
² As-extruded data from Example 12.
³ Method Two.
NOTE.—O.A.=Orientation angle; A=Poly(p-phenylene terephthalamide); B=Poly(2-chloro-p-phenylene terephthalamide).

EXAMPLE 16

This example illustrates the preparation of fibers of poly(2-chloro-p-phenylene terephthalamide) which are obtained by sinning both anisotropic and isotropic dopes. It is demonstrated that stronger fibers are obtained from the anisotropic dope.

A solution of 2-chloro-p-phenylenediamine (570.4 g., 4.0 mole) in N,N-dimethylacetamide (16 l.) is stirred for 0.5 hr. at −10° C. Terephthaloyl chloride (772 g., 3.8 mole) is then added over a period of 6 min. to form a fluid, stir opalescent dope. Stirring is maintained for 0.5 hr. at −10° C., after which lithium carbonate (295.6 g., 4 moles) is added. The reaction mixture is stirred for 10 more minutes at −10° C., after which an additional 30 g. (0.148 mole) of terephthaloyl chloride are added. The resulting stiff gel becomes more fluid after an additional 2 hr. of stirring. The cooling bath is then removed and the dope is stirred overnight at room temperature to give a fluid dope which is then passed through a 10$\mu$ filter. A sample of polymer, obtained as in Example 8, exhibits $\eta$inh=3.69.

The anisotropic (stir opalescent) dope is extruded at room temperature through a 2000-hole spinneret (hole diameter is 0.002 in.) into a coagulating bath of water maintained at 28° C. The merging filaments are wound up at 120 ft./min., washed, and dried on a heated roll. Four bobbins of yarn are collected, the first two obtained with no screens in the spinneret and the last two obtained with 50/200/325/50 mesh screens being employed. The third bobbin of yarn exhibits the following properties: Den/T/E/Mi: 706/13.7/4/532 (not boiled off). The yarn sample on the second bobbin exhibits the following comparable properties: 698/13.1/4.3/503; O.A. = 25° (not boiled off).

A sample of the above-prepared anisotropic spinning dope is rendered isotropic by being diluted with N,N-dimethylacetamide to form an isotropic dope containing 2.5 percent by weight of the polyamide. This isotropic dope is extruded through the spinneret described above (with screens) into a water coagulating bath maintained at 26°. The emerging yarn is wound up at 120 ft./min., washed, and dried on a heated roll. The yarn exhibits the following properties: Den/T/E/Mi: 300/9.6/3.3/445 (not boiled off); O.A. = 29°.

EXAMPLE 17

This example illustrates the preparation of poly(p-phenylene terephthalamide), and high modulus fibers thereof.
Polymer Preparation Powdered terephthaloyl chloride (101.55 g., 0.5 mole) is added to a solution of p-phenylenediamine (54.0 g., 0.5 mole) in a mixture of hexamethylphosphoramide (600 ml.) and N-methyl-2-pyrrolidone (300 ml.) and stirred at high speeds in a blender. A solid mass is obtained within minutes. After 20 min., the mass is combined with water and stirred at high speeds in a gallon-size (3.785 liter) blender. The polymer is washed four times with water, once with alcohol, and finally with acetone by being stirred in a blender and isolated by being filtered on a Buchner funnel. The polymer is dried overnight in a vacuum oven at about 100° C. The yield of polymer is 116 g. (97.5 percent of theoretical). The inherent viscosity, measured as a solution of 125 mg. polymer in 25.0 ml. of 95–98 percent (by weight) sulfuric acid, is 3.8.
Anisotropic Dope Preparation A mixture of 50.0 g. of the above polymer and 450.0 g. of fuming (0.8 percent free $SO_3$) sulfuric acid is mixed anhydrously with an air-driven disc-type stirrer in a 500-ml. resin-making kettle while cooling with an ice/water bath. The mixture is stirred overnight during which time the cooling bath is allowed to warm to room temperature. The resulting dope exhibits stir-opalescence and depolarizes plane polarized light. It exhibits a solution viscosity at room temperature of 5,000 poise, measured by a Brookfield (model RVF) viscometer employing a No. 7 spindle, at a spindle rate of 2 r.p.m.; at a rate of 20 r.p.m. the dope exhibits a solution viscosity of only 1,660 poise.
Fiber Preparation by Wet Spinning The spin dope prepared above is centrifuged to remove entrapped air. It is then extruded at the rate of about 0.8 ml./min. under a pressure of 370 lb./in.² (26 kg./cm.²) through a 0.025 inch (0.064 cm.) thick precious metal spinneret having 20 holes of 0.002 in. (0.0051 cm.) diameter into an aqueous coagulating bath maintained at 43° C. The bath is about 16 in. (40 cm.) wide, 5.5 in. (14 cm.) deep and 37 in. (94 cm.) long with stainless steel rollers placed about 2 ft. (0.61 m.) from each other. The yarn is drawn through the bath and around the rollers such that it makes three passes through the water bath. It is then snubbed out of the bath at about a 45° angle to an electrically driven wind-up device. The yarn is collected on a perforated bobbin at 27 ft./min. (8.24 m./min.) while being wetted on the bobbin by passing through a water reservoir located at the lower portion of the collection bobbin. It is then washed in cool running water overnight and a portion is removed for heat treatment. The remainder is dried on the bobbin in air at room temperature. The dry filaments exhibit low crystallinity and an orientation angle of 31° and a sonic velocity of 5.00 km./sec. Filaments exhibit the following T/E/Mi/Den. values: 7.0/9.1/173/1.93 (10 percent rate of extension) (not boiled off).
Heat Treatment of Wet Fibers The wet (washed) yarn prepared above is passed at 25 ft./min. (7.63 m./min.) through a tube heated to 500° C. and collected at 26.5 ft./min. (8.09 m./min.). The resulting filaments exhibit high crystallinity and an orientation angle of 11° as measured from a wide angle X-ray pattern. Filaments exhibit the following T/E/Mi/Den. values: 13.7/1.6/883/3.23 (not boiled off).

EXAMPLE 18

This example illustrates the preparation of poly(2-chloro-p-phenylene terephthalamide), an anisotropic spin dope in N,N-dimethylacetamide/lithium chloride and high modulus fibers therefrom.

Polymer Preparation

Powdered terephthaloyl chloride (95.0 g., 0.468 mole) is added at once to a cooled (ca. 3° C.) solution of 2-chloro-p-phenylene diamine (71.4 g., 0.502 mole) in 2,000 ml. of N,N-dimethylacetamide; the mixture is stirred at high speeds while being cooled with an ice/water bath. The mixture becomes stir-opalescent after about 1 to 2 minutes. Ten minutes after the addition of terephthaloyl chloride, 37.0 g. (0.501 mole) of powdered lithium carbonate is added at once with sufficient cooling to maintain the temperature at less than about 10° C. After stirring is continued for about 5 min., powdered terephthaloyl chloride is added in small amounts until the mixture is quite thick. The cooling bath is removed and the dope is allowed to warm to room temperature at which time more powdered terephthaloyl chloride is added over a period of a few minutes (i.e., 5 min.) in small increments until a maximum of 0.500 mole total terephthaloyl chloride has been added, or until the dope no longer flows. Usually a smaller quantity (i.e., 0.490 mole) is used in order to maintain at all times a fluid dope. The dope is then allowed to stand at room temperature for a few hours (i.e., 12 hr.) during which time it becomes somewhat more fluid. A small portion of the dope is combined with water and agitated in a high speed blender. The polymer is collected by filtering through a glass-funnel of coarse porosity. The wet polymer is dried in a vacuum oven at about 70° C. The inherent viscosity measured is 2.79. The dope is combined with another similarly prepared dope and used directly for yarn production. The dope exhibits stir-opalescence and depolarizes polarized light.

Fiber Preparation by Wet Spinning

The spin dope prepared above is extruded at the rate of about 41 ml./min. through a precious metal spinneret having 580 holes of 0.003 in. (0.0076 cm.) diameter into an aqueous coagulating bath maintained at about 15° C. The bath is about 12 in. (30.48 cm.) wide, 4.5 in. (10.8 cm.) deep and 5.5 ft. (1.676 m.) long. The filament bundle is drawn through the bath and snubbed out of the bath at about a 45° angle to an electrically driven wind-up device. The yarn is collected at 144 ft./min. (43.89 m./min.), washed in cool running water for a few hours (i.e., 3 hrs.) and then dried in air at room temperature. The dry filaments exhibit low crystallinity and an orientation angle of 30° as measured from a wide angle X-ray pattern. A yarn twisted at three turns per inch exhibits the following T/E/Mi/Den. values: 11.4/5.6/379/555 (not boiled off).

Heat Treatment

The yarn prepared above is passed at 15 ft./min. (4.572 m./min.) through a nitrogen filled tube assembly heated to 450° C. and collected at 15.75 ft./min. (4.801 m./min.). The resulting filaments exhibit high crystallinity and an orientation angle of 12° as measured from a wide angle X-ray pattern. A 10-inch length of yarn twisted at three turns per inch exhibits the following T/E/Mi/Den. values: 11.9/1.4/875/493 (not boiled off) and the yarn exhibits a sonic velocity of 7.84 km./sec.

EXAMPLE 19

This example illustrates the percentage of crystallites aligned within an angle equal to one-half the orientation angle of the fiber axis for particular as-extruded polymer samples from some of the foregoing examples. The intensity trace of the fiber's diffraction pattern of each of these samples is not necessarily Gaussian-like curve.

The orientation angle of each of the following as-extruded samples is determined using Method Three, previously described, and the percentage of crystallites is determined also as previously described. The difference, if any, in the stated orientation angle value, is due to the greater degree of precision in Method Three, as compared to Method One values stated in the preceding examples. The orientation angle and crystallite percentage values are stated in the following table (Table IV). As the table indicates in each instance, greater than about 50 percent of the crystallites are aligned within one-half the orientation angle.

TABLE IV

| Example | O.A. | % of Aligned Crystallites |
|---------|------|---------------------------|
| 17 | 29° | 65% |
| 18 | 24° | 68% |

EXAMPLE 20

This example illustrates the preparation of high modulus fiber of ordered poly(chloro-p-phenylene terephthalamide).

Preparation of N,N'-bis(4-nitro-2-chlorophenyl)terephthalamide

In a 1 l. three-neck round bottom flask provided with a stirrer, nitrogen inlet and drying tube, a solution of 52.56 g. (0.3 mole) 4-nitro-2-chloroaniline (recrystallized from water) in 250 ml. of distilled hexamethylphosphoramide is prepared. The solution is cooled with an ice bath, and 30.45 g. (0.15 mole) terephthaloyl chloride is added in small portions over a period of 1½ hours. After the addition is completed, the ice-bath is removed. A precipitate forms in 4 hours and the resulting suspension is stirred for 20 hours. After this period 1 l. of water is added to precipitate the product. The pale yellow powder is filtered, and washed two times with hot water in a blender. After being dried at 80° C. in a vacuum oven, 68.2 g. (95 percent of theoretical) of product is obtained; m.p. 339° C. (determined by Differential Thermal Analysis).

The IR spectrum shows carbonyl absorption at $5.87\mu$, $NO_2$ and $\phi$—Cl absorption.

Preparation of N,N'-bis(4-amino-2-chlorophenyl)terephthalamide

Forty grams of the above dinitro-compound is reduced in 320 ml. N,N-dimethylacetamide using Raney Ni catalyst at 100° C. and 900 psi (63.2 kg./cm.$^2$) hydrogen over a period of 3 hours. The resulting solution is heated to 100°, filtered free of suspended catalyst, and is treated with water at 90°–95° to the cloud point. A fine precipitate separates out on cooling. This is collected, washed two times with warm water, and dried in a vacuum oven at less than 100° C. The yield of diamine is 26.4 g. m.p. 261° C. The infrared spectrum shows carbonyl absorption at $6.05\mu$, amine absorption, and is consistent with the expected structure.

Anal. Calcd. for $C_{20}H_{16}N_4O_2Cl_2$:
Calcd.: C, 57.84; H, 3.88; N, 13.49
Found: C, 58.92; H, 3.83; N, 13.37

Preparation of high modulus fibers of an ordered poly(chloro-p-phenylene terephthalamide)

In a 500-ml. resin kettle equipped with an air-driven basket type stirrer, a nitrogen inlet, and a driving tube is is placed N,N'-bis(4-amino-2-chlorophenyl)terephthalamide (6.23 g., 0.015 mole), lithium chloride (1.25 g.) and N,N-dimethylacetamide (120 ml.). The solution is cooled with a wet ice bath for 15 minutes, then terephthaloyl chloride (2.74 g., 0.0135 mole) is added. The resulting mixture is stirred rapidly. After 5 minutes, lithium carbonate (1.11 g.) is added. After an additional 5 minutes, the reaction mixture appears as a slightly viscous solution. Additional terephthaloyl chloride (0.25 g.) is added in small quantities and allowed to react until the reaction mixture appears as a soft gel. The solution is stirred overnight, and after standing for several days forms a solution which has the property of depolarizing light when observed between crossed polars. A small portion of the solution is precipitated in water, and the solid polymer which results is washed several times with water and acetone, then dried in a vacuum oven. The polymer has an inherent viscosity of 3.25.

The above-prepared dope is centrifuged to remove air bubbles and is then extruded through a 60-hole spinneret, each hole of 0.002 inch (0.05 mm.) diameter, into a water bath at 10° C. The filaments are wound up at the rate of 50 ft./min. (15.2 m./min.) and washed in distilled water overnight. After the yarn is dried in air at room temperature, the following filament properties are observed: T/E/Mi/Den = 10.6/6.6/343/1.49 (not boiled off); orientation angle = 32°. The sonic velocity observed is 5.91 km./sec., measured at 0.1 gm./den. tension.

The yarn is heat treated by being passed at an input speed of 25 ft./min.(7.6 m./min.) through a tube heated to 437° C; the yarn is drawn 1.06X while passing through the tube. Filaments then exhibit the following properties: T/E/Mi/Den. = 13.3/1.9/763/1.36 (not boiled off); orientation angle = 13°.

EXAMPLE 21

This example illustrates the preparation of fibers of random copoly(p-phenylene terephthalamides) of this invention containing non-conforming aromatic para-oriented amide units.

To a stirred solution of hexamethylphosphoramide (500 ml.), N-methylpyrrolidone-2 (260 ml.), p-phenylenediamine (32.4 g., 0.23 mole), cooled in an ice/water bath, is added (anhydrously) dry p-aminobenzoyl chloride hydrochloride (14.38 g., 0.07 mole) over a period of 5 minutes. Terephthaloyl chloride (60.9 g., 0.3 mole) is then added while maintaining vigorous stirring. After 2 minutes, the reaction mixture becomes a clear gel which is left to stand overnight at room temperature. The reaction mixture is then mixed with water to precipitate the polymer which is collected, washed with water, and dried in a vacuum oven at 70° C. The product is triturated with hot formic acid, washed with water, and redried; $\eta$inh = 4.68. The polymer contains about 11.7 mol percent of non-conforming comonomer units.

A spinning dope is prepared by stirring overnight a mixture of 24 g. of the above-prepared copolyamide and 176 g. of 100.64 percent sulfuric acid. The resulting dope is stir opalescent and depolarizes plane polarized light under crossed polarizes. The dope is extruded through 20-hole spinneret (hole diameter is 0.002 in.) into a water bath maintained at 27° C. The yarn is passed around two snubbing pins (160°/180° angles) in the bath before being wound up at 20 ft./min., washed in water overnight and dried on the bobbin at room temperature. Filaments of the yarn exhibit the following properties: Den/T/E/Mi: 3/9.69/4.1/424 (not boiled off); O.A. = 17°.

EXAMPLE 22

This example illustrates the preparation of random copoly(p-phenylene terephthalamides) of this invention containing non-para amide comonomer units, dopes thereof, and fibers thereof.

Copolymer Preparation

Sublimed isophthaloyl chloride (0.51 g., 0.0025 mole) is added at once to a solution of p-phenylenediamine (5.40 g., 0.050 mole) in a mixture of hexamethylphosphoramide (65 ml.) and N-methyl-2-pyrrolidone (35 ml.) contained in a 500 ml. resin-making kettle equipped with an air-driven stirrer and a calcium chloride drying tube. The mixture is stirred for 2 min. and powdered sublimed terephthaloyl chloride (9.65 g., 0.0475 mole) is added at once with vigorous stirring. The temperature of the reaction mixture is moderated with a cool i.e., 20° C.) water bath. Stirring is continued until an unstirrable mass is obtained. The mixture is allowed to stand overnight at room temperature, and is then combined with water and stirred at high speeds in a gallon-size (3.785 liter) blender. The polymer is washed three times with water by being stirred in a blender and isolated by being filtered on a sintered-glass coarse-pore Buchner funnel. The polymer is dried overnight in a vacuum oven at about 70° C. The yield of polymer is 11.5 g. and the inherent viscosity is 4.48 as measured from a solution of 125 mg. polymer in 25.0 ml. of 95–98 percent (by weight) sulfuric acid. The polymer contains about 2.5 mol. percent of non-conforming comonomer units.

A mixture of 5.0 g. of the polymer and 45.0 g. of fuming (0.8 percent free $SO_3$) sulfuric acid is mixed anhydrously with a mechanically driven, paddle-type stirrer in a 200 ml. round bottom flask while cooling with an ice/water bath. The mixture is allowed to stir overnight during which time the cooling bath is allowed to warm to room temperature. The resulting very viscous dope exhibits stir-opalescence and depolarizes plane-polarized light.

The spin dope prepared above is centrifuged to remove entrapped gases. It is then extruded by means of mechanically driven syringe through a 0.010 in. (0.025 cm.) thick precious metal spinneret having 20 holes of 0.003 in. (0.0076 cm) diameter into an aqueous bath at 25° C. The water bath is about 2 in. (5.1 cm.) wide and about 1 in. (2.54 cm.) deep. After passing through the bath for about 2.5 ft. (0.75 m.), the yarn is snubbed out of the water at about a 45° angle to an electrically driven wind-up device. The yarn is collected on a perforated bobbin at 22 ft./min. (7.22 m./min.). It is then washed in cool running water for several (i.e., 3 hr.) hours and dried in air at room temperature. The filaments exhibit low crystallinity and an orientation angle of 35° as measured from a wide angle X-ray pattern. Filaments exhibit the following T/E/Mi/Den. values: 7.7/11.3/195/4.22 (not boiled off).

EXAMPLE 23

This example illustrates the preparation of random copoly(p-phenylene terephthalamides) of this invention containing non-amide (urea) comonomer units in varying percentages, together with dopes and fibers of these random copolymers. It will be observed that the anisotropic dopes of Parts A and B yield stronger fibers (e.g., of higher tenacity and modulus) than does the isotropic dope of Part C. Relative ratios of the randomly repeating units.

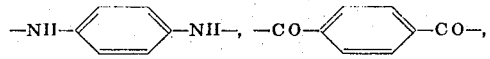

and

are shown for each part of the Example.

PART A

Polymer Preparation

A quart-size (946 ml.) glass blender jar is dried by heating the inside surface with hot air at 150° C. The blender jar is allowed to cool to room temperature inside a dry box, i.e., a chamber maintained under anhydrous conditions. Hexamethylphosphoramide (180 ml., distilled from calcium hydride at reduced pressure and stored in the dry box over molecular sieves), N-methylpyrrolidone (90 ml., distilled from calcium hydride at reduced pressure and stored in the dry box over molecular sieves), and lithium chloride (7.5 g., dried in a vacuum oven at 200° C. and stored in the dry box) are transferred to the blender jar. A plastic cover for the blender jar is wrapped in aluminum foil and placed on the blender. The blender jar is removed from the dry box. A flow of dried nitrogen gas is introduced into the blender jar through a hole in the plastic cover and aluminum foil. The mixture is stirred at a moderate speed until all the lithium chloride has dissolved. Sublimed p-phenylenediamine (16.22 g., 0.150 mole) is weighed out in the dry box and transferred to the blender jar. The mixture is stirred at a moderate speed until all the p-phenylenediamine has dissolved.

p-Phenylene diisocyanate (2.40 g., 0.015 mole) is weighed out in the dry box and transferred to the blender jar. The mixture is stirred at a moderate speed for 12 minutes. Sublimed terephthaloyl chloride (27.41 g., 0.135 mole) is weighed out in the dry box. The solution in the blender jar is stirred very rapidly as the terephthaloyl chloride is added. The solution gels to a solid mass in less than 10 seconds after addition of the terephthaloyl chloride. This gel is allowed to stand for 5 hours, and is then added to water in a gallon-size (3.79 l.) blender and stirred at high speed. The precipitated polymer is filtered on a coarse, sintered-glass Buchner funnel. The polymer is washed three additional times with water, and one time with acetone, filtering the polymer after each washing. The polymer is dried in a vacuum oven at 80°–100° C. The yield of polymer is 35.9 g. (99 percent). The polymer has an inherent viscosity of 1.83. Ratio of units is 9:9:1; this corresponds to about 5 mol percent of non-conforming comonomer units.

Dope Preparation

A 500-ml. resin kettle equipped with a stainless steel "eggbeater" type stirrer is dried in a vacuum oven and allowed to cool to room temperature in a dry box. In the resin kettle are placed 34 g. of polymer and 145 ml. concentrated sulfuric acid (100.54 percent by titration). The resin kettle is removed from the dry box and connected to an air driven stirrer motor. The mixture is stirred overnight, moderating the temperature by a water bath at room temperature. A smooth, hazy dope containing 13 percent polymer by weight is formed. The dope depolarizes light when observed as a thin layer between crossed polarizers Fiber Preparation and Fiber Properties As Extruded The polymer dope prepared above is placed in a stainless steel spinning cell and extruded at a pressure of 400 lb./in.² (28.12 Kg/cm²) through a platinum spinneret having 20 holes of 0.003 inches (0.076 mm) diameter into a water bath at 10°–20 C. The fibers are guided out of the water bath and the yarn is wound up at the rate of 12 ft/min. (3.66 m/min). The bobbins containing the yarn are allowed to stand in distilled water overnight, and then dried in air. The inherent viscosity of the polymer in the yarn is 1.75 determined in concentrated sulfuric acid. The fibers have low crystallinity, an orientation angle of approximately 45° and a sonic velocity of 4.40 km./sec. The average tensile properties are T/E/Mi/Den. = 3.52/16.5/1194.01 (not boiled off).

Fiber Heat Treatment and Properties.

The fiber is heat treated by passing the yarn (20 filaments) through a heated tube. The wall of the tube in the center is maintained at 599° C. The fiber input speed is 25 ft./min. (7.62 m./min.), and the yarn is increased in length by 10 percent on passing through the tube. The resulting yarn has high crystallinity, an orientation angle of 14°, a sonic velocity of 8.47 km./sec. and the following average filament tensile properties: T/E/Mi/Den.=8.41/1.5/581/3.47 (not boiled off).

PART B

Polymer Preparation

Polymer having an inherent viscosity of 2.87 and a ratio of the above-mentioned units of 95:95:5 is prepared in a manner similar to that of Part A. The non-conforming comonomer unit content is about 2.5 mol percent.

Dope Preparation

A 100 ml. round-bottom flask is dried in a vacuum oven and cooled to room temperature in a dry box. (The flask is equipped with a Teflon TFE-fluorocarbon stirrer.) In the flask are placed 15 g. of the polymer and 65 ml. concentrated sulfuric acid (100.44 percent by titration). The mixture is stirred, moderating the temperature by means of a water bath at room temperature. Stirring soon becomes difficult, and additional acid (10 ml.) is added. Cooling with an ice-water bath also helps in the preparation of the dope. After stirring for the necessary period, the mixture becomes a smooth, hazy dope. This dope depolarizes light when observed as a thin layer between crossed polarizers.

Fiber Preparation and Fiber Properties As Extruded

The polymer dope prepared above is placed in a Teflon TFE - fluorocarbon lined, mechanically driven, stainless steel syringe and extruded through a platinum spinneret having 20 holes of 0.003 in. (0.076 mm) diameter into a water bath at 10°–20 C. The fibers are guided out of the water bath and wound up at the rate of 10.5 ft./min. (3.2 m/min.). The bobbins containing the fiber are allowed to stand in distilled water overnight, then dried in air. The inherent viscosity of the polymer in the fiber is 2.84. The average tensile properties of the filaments are (70° F., 65% R.H.) T/E/M$_i$/Den = 5.55/10.7/1813.00 (not boiled off). The fibers have medium crystallinity, an orientation angle of 45° and a sonic velocity of 4.44 km./sec.

Fiber Heat Treatment and Properties

Yarn from a second bobbin of the above spinning experiment, having average filament tensile properties T/E/M$_i$/Den = 5.24/14.8/168/8.55, is heat-treated by passing the fibers through a heated tube. The wall of the tube in the center is maintained at 599° C. The fiber input speed is 25 ft./min. (7.62 m./min.), and the fiber is increased in length by 10 percent on passing through the tube. The resulting fiber has high crystallinity, an orientation angle of 11°, a sonic velocity of 8.98 km./sec. and the following average filament tensile properties; T/E/Mi/Den.=9.96/1.1/847/4.60 (not boiled off).

PART C

Polymer Preparation

Polymer having an inherent viscosity of 2.82 and a ratio of the above-mentioned units of 4:4:1 is prepared in a manner similar to that of Part A. The non-conforming comonomer unit content is about 10 mol percent.

Dope Preparation

In a 100 ml. round-bottom flask equipped with a Teflon TFE-fluorocarbon stirring blade is placed 5.0 g. polymer and 35 ml. of 100.7 percent (by titration) sulfuric acid. The mixture is stirred, moderating the temperature by means of a water bath at room temperature. The polymer dissolves to a clear, very viscous solution. Additional acid (15 ml.) is added so that after mixing a clear, viscous spinnable solution is formed. This dope does not depolarize plane polarized light.

Fiber Preparation and Fiber Properties As Extruded

The polymer dope prepared above is placed in a Teflon TFE-fluorocarbon lined mechanically-driven, stainless steel syringe and extruded through a platinum spinneret having 20 holes of 0.003 inches (0.076 mm.) diameter into a water bath at 10°–20° C. The fibers are guided out of the water bath and wound up at the rate of 13 ft./min. (3.96 m/min.). The bobbins containing the fiber are allowed to stand in distilled water overnight, and then dried in air. The fibers have trace crystallinity, an orientation angle of 65°, a sonic velocity of 3.21 km./sec. and the following average filament tensile properties: T/E/Mi/Den.=2.40/41.1/79/4.85 (not boiled off).

Fiber Heat Treatment and Properties

The fibers prepared above are heat treated by passing the yarn through a heated tube while increasing the length of the fiber by 10 percent. The input speed of the fibers is 25 ft./min. (8.2 m./min.), and the wall of the tube is maintained at 554° C. near the center of the length of the tube. The resulting fiber has high crystallinity, an orientation angle of 18°, and average filament tensile properties T/E/Mi/Den. = 3.93/1.3/300/4.34 (not boiled off).

EXAMPLE 24

This example illustrates the preparation of a random copoly(p-phenylene terephthalamide) of this invention containing oxadiazole repeating units. The polymer, comprised of the following repeating units,

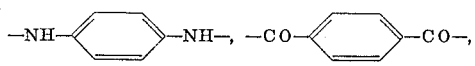

and

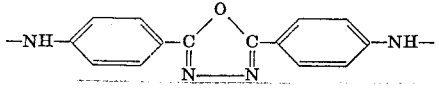

is used to prepare high strength fibers of this invention.

Polymer Preparation

A solution of 3.24 g. (0.03 mole) p-phenylenediamine and 2.52 g. (0.01 mole) 2,5-bis(p-aminophenyl)-1,3,4-oxadiazole in a mixture of 90 ml. of hexamethylphosphoramide and 45 ml. of N-methylpyrrolidone is prepared in a blender jar in a drybox. Terephthaloyl chloride, 8.12 g. (0.04 mole) is added at once with rapid stirring. A very viscous, clear solution results which in 2 minutes becomes unstirrable. It is left undisturbed for 16 hrs. The polymer is worked up in water and is washed in the blender four times with water, one time each with acetone and alcohol, and is dried in a 100° C. vacuum oven; $\eta$inh is 3.28. The polymer has the above-mentioned units in the relative value 3:4:1, which corresponds to about 12.5 mol percent of non-conforming comonomer units.

Dope Preparation

A dope is prepared from the above polymer by combining 6 g. of polymer, 44 g. of 100.7% $H_2SO_4$ and 10 g. of fuming (20 percent free $SO_3$) sulfuric acid. This mixture is stirred until a very stiff gel results. It is left undisturbed for 2 weeks. Although the dope appears to be a fracturable gel, it can be poured slowly into the spinning cell. The dope depolarizes plane-polarized light.

Spinning and As-Extruded Properties

The dope from above is transferred into the spinning cell and is centrifuged for 1 hour. Wet spinning is done from a motor driven syringe fitted with a heavy face spinneret having 20 holes of 0.003 in. (0.076 mm.) diameter each. The filaments are coagulated in room temperature water contained in a metal trough. The length of immersion is 33 in. (83.8 cm.). The filaments are wound up at 26.5 ft./min. (8.1 m./min.) while the bobbin is rotated in a pan of water. The yarn is then soaked in distilled water for 16 hrs. and dried. As-extruded yarn properties are: T/E/Mi/Den.: 2.4/14.4/94.5/103 (10 percent rate of extension) (not boiled off). The yarn has trace amounts of crystallinity, an orientation angle of 50° and a sonic velocity of 3.35 km./sec.

Heat Treatment and Properties

The wet yarn from above is drawn 1.1X through a hot tube at 475° C. with an input speed of 12.5 ft./min. (3.81 m./min.). The drawn yarn has the following properties: T/E/Mi/Den.: 3.8/0.9/500/57 (not boiled off). It has medium crystallinity and an orientation angle of 15°, and a sonic velocity of 6.80 km./sec.

EXAMPLE 25

This example illustrates the preparation of a high viscosity sample of copoly(p-phenylene/2-chloro-p-phenylene terephthalamide), 50/50, and the spinning of strong fibers thereof.

p-Phenylenediamine (8.36 g., 0.0775 mole), 2-chloro-p-phenylenediamine (11.02 g., 0.0775 mole), and N,N-dimethylacetamide (500 ml.) are mixed together under nitrogen. The stirred solution is then cooled (to about 10°–15° C.) in an ice bath. Terephthaloyl chloride (31.42 g., 0.155 mole) is added to the reaction vessel while vigorous stirring is maintained. Lithium carbonate (11.3 g., 0.15 mole) is added to the stirred mixture 3 minutes after the addition of the acid chloride. The cooling bath is removed and the reaction mixture is stirred to form a fluid, anisotropic (stir opalescent) dope. A sample of the dope is removed and combined with water to precipitate the copolymer which is isolated, washed, and dried; $\eta$inh = 3.85.

The dope is extruded at room temperature through a 100-hole spinneret (hole diameter is 0.0025 in.) into an aqueous coagulating bath maintained at 16° C. The emerging filaments are wound up at 110 ft./min., washed, and dried. The resulting yarn exhibits the following properties: Den./T/E/Mi: 183/9.2/5.7/364 (not boiled off); O.A. <35°.

What is claimed is:

1. Optically anisotropic spinning dope consisting essentially of:
   I. from about 5 to 25 percent by weight of a polycarbonamide having an inherent viscosity of at least 0.7 and consisting essentially of recurring units of the formula:

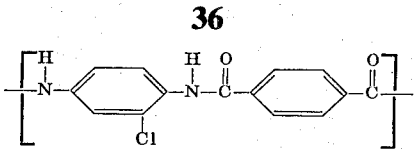

II. from 0.5 to 8 percent by weight of a salt selected from the group consisting of:
      II-A. lithium chloride and
      II-B. calcium chloride, and
   III. at least one liquid medium selected from the group consisting of:
      III-A. N,N-dimethylacetamide
      III-B. hexamethylphosphoramide
      III-C. N-methylpyrrolidone-2, and
      III-D. N,N,N',N'-tetramethylurea said polycarbonamide being present in the dope in a concentration above the level at which there is a decrease in viscosity with increasing concentration represented by a sharp discontinuity in the slope of the plot of the dope viscosity vs. polymer concentration curve without the formation of a solid phase.

2. Optically anisotropic spinning dope of claim 1 consisting essentially of:
   about 5 to 25 weight percent of said polycarbonamide having an inherent viscosity between about 0.7 and 4.5,
   about 0.5 to 8 weight percent of (II–A), and
   the remainder being (III–A).

3. Optically anisotropic spinning dope consisting essentially of:
   I. from about 5 to 25 percent by weight of a polycarbonamide having an inherent viscosity of at least 0.7 and consisting essentially of recurring units of the formula:

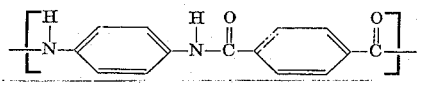

II. from 0.5 to 8 percent by weight of a salt selected from the group consisting of:
      II-A. lithium chloride and
      II-B. calcium chloride, and
   III. a liquid medium consisting essentially of:
      25 to 67 weight percent of hexamethylphosphoramide with the balance being at least one amide medium selected from the group consisting of N,N-dimethylacetamide and N-methylpyrrolidone-2, said polycarbonamide being present in the dope in a concentration above the level at which there is a decrease in viscosity with increasing concentration represented by a sharp discontinuity in the slope of the plot of the dope viscosity vs. polymer concentration curve without the formation of a solid phase.

4. Optically anisotropic spinning dope of claim 3 consisting essentially of:
   about 5 to 15 weight percent of said polycarbonamide having an inherent viscosity between about 0.7 and 5,
   about 0.5 to 5 weight percent of (II–A) and,
   the remainder being a mixture of hexamethylphosphoramide and N-methylpyrrolidone-2, wherein hexamethylphosphoramide comprises 33 to 67 percent by volume of the said mixture.

5. Optically anisotropic spinning dope of claim 3 consisting essentially of:
   about 5 to 15 weight percent of said polycarbonamide having an inherent viscosity between about 0.7 and 5,
   about 0.5 to 5 weight percent of (II–A) and,
   the remainder being a mixture of hexamethylphosphoramide and N,N-dimethylacetamide, wherein hexamethylphosphoramide comprises 33 to 67 percent by volume of the said mixture.

* * * * *